United States Patent
Smits et al.

(10) Patent No.: US 12,416,804 B1
(45) Date of Patent: Sep. 16, 2025

(54) KALEIDOSCOPIC LASER BEAM PROJECTION SYSTEM

(71) Applicant: Summer Robotics, Inc., Campbell, CA (US)

(72) Inventors: Gerard Dirk Smits, Los Gatos, CA (US); Matthew Alan Leone, Missoula, MT (US)

(73) Assignee: Summer Robotics, Inc., Campbell, CA (US)

( * ) Notice: Subject to any disclaimer, the term of this patent is extended or adjusted under 35 U.S.C. 154(b) by 0 days.

(21) Appl. No.: 19/203,054

(22) Filed: May 8, 2025

Related U.S. Application Data

(60) Provisional application No. 63/731,484, filed on May 8, 2024.

(51) Int. Cl.
*G02B 26/08* (2006.01)
*G02B 26/10* (2006.01)
(Continued)

(52) U.S. Cl.
CPC ......... *G02B 26/105* (2013.01); *G02B 26/101* (2013.01); *G02B 26/121* (2013.01); *G02B 26/123* (2013.01); *G02B 30/10* (2020.01)

(58) Field of Classification Search
CPC .. G02B 26/105; G02B 26/101; G02B 26/121; G02B 26/123; G02B 30/10
See application file for complete search history.

(56) References Cited

U.S. PATENT DOCUMENTS

| | | | |
|---|---|---|---|
| 6,748,112 | B1 | 6/2004 | Nguyen et al. |
| 9,117,267 | B2 | 8/2015 | Francis, Jr. et al. |

(Continued)

FOREIGN PATENT DOCUMENTS

| | | |
|---|---|---|
| CN | 109458928 A | 3/2019 |
| CN | 112365585 A | 2/2021 |

(Continued)

OTHER PUBLICATIONS

International Search Report and Written Opinion for International Patent Application No. PCT/US2021/063399 mailed Mar. 22, 2022, 6 Pages.

(Continued)

*Primary Examiner* — Euncha P Cherry
(74) *Attorney, Agent, or Firm* — John W. Branch; Branch Partners PLLC

(57) ABSTRACT

A kaleidoscopic laser beam projector (KLBP) system that employs a single moving structure to project patterns of sweeping laser beams with diverse sweep directions and emission apertures. The system comprises a collimated light source, a spinning mirror deflector ("spindle/flutter mirror") at the center, and a stationary kaleidoscopic mirror containing multiple facet mirrors arranged in a concave fashion around the spindle mirror. As the spindle mirror rotates, it directs laser beams in a radially whirling movement toward the facet mirrors, which then subdivide these beams into multiple short strokes and redirect them outward in different directions. Various embodiments include configurations with diffractive optical elements (DOEs) for beam splitting, different kaleidoscopic mirror geometries (hexagonal, octagonal, etc.), and innovative flutter mirror mechanisms that create controlled angular variations during rotation. The system enables a "4×1" configuration that replaces traditional "4×4" systems requiring eight motors and multiple moving structures. The KLBP system offers significant advantages including mechanical simplicity, reduced size and weight, improved energy efficiency, enhanced reliability, cost-effectiveness, and modular configurability. The diverse beam incidence angles enable superior illumination of complex three-dimensional objects for applications in machine vision systems, precision metrology, gap and flush- (Continued)

ness inspection, and robot-assisted assembly of complex structures.

20 Claims, 23 Drawing Sheets

(51) Int. Cl.
    *G02B 26/12*     (2006.01)
    *G02B 30/10*     (2020.01)

(56)          References Cited

U.S. PATENT DOCUMENTS

| | | |
|---|---|---|
| 9,489,735 B1 | 11/2016 | Reitmayr |
| 10,213,645 B1 | 2/2019 | Wu et al. |
| 11,704,835 B2 | 7/2023 | Cullen et al. |
| 11,785,200 B1 | 10/2023 | Smits et al. |
| 11,808,857 B2 | 11/2023 | Cullen et al. |
| 11,887,340 B2 | 1/2024 | Cullen et al. |
| 11,974,055 B1 | 4/2024 | Smits et al. |
| 12,111,180 B2 | 10/2024 | Paden |
| 12,148,185 B2 | 11/2024 | Cullen et al. |
| 12,262,127 B2 | 3/2025 | Smits et al. |
| 12,276,730 B2 | 4/2025 | Smits et al. |
| 2008/0012850 A1 | 1/2008 | Keating, III |
| 2008/0165360 A1 | 7/2008 | Johnston |
| 2008/0201101 A1 | 8/2008 | Hebert et al. |
| 2009/0087029 A1 | 4/2009 | Coleman et al. |
| 2009/0096994 A1 | 4/2009 | Smits |
| 2011/0122233 A1 | 5/2011 | Kasai et al. |
| 2011/0273442 A1 | 11/2011 | Drost et al. |
| 2014/0105506 A1 | 4/2014 | Drost et al. |
| 2014/0368614 A1 | 12/2014 | Imai et al. |
| 2015/0378023 A1 | 12/2015 | Royo Royo et al. |
| 2016/0180574 A1 | 6/2016 | Kaminitz et al. |
| 2016/0259168 A1 | 9/2016 | Katz et al. |
| 2017/0035281 A1 | 2/2017 | Takeuchi et al. |
| 2017/0068861 A1 | 3/2017 | Miller et al. |
| 2017/0176575 A1 | 6/2017 | Smits |
| 2017/0195589 A1 | 7/2017 | Kovacovsky et al. |
| 2018/0180733 A1 | 6/2018 | Smits |
| 2019/0128665 A1 | 5/2019 | Harendt |
| 2019/0213309 A1 | 7/2019 | Morestin et al. |
| 2019/0235081 A1* | 8/2019 | Smits .................. G01S 17/931 |
| 2019/0258869 A1 | 8/2019 | Stelzer et al. |
| 2019/0279379 A1 | 9/2019 | Srinivasan et al. |
| 2020/0075658 A1 | 3/2020 | Kato et al. |
| 2020/0160012 A1 | 5/2020 | Nunnink et al. |
| 2020/0280664 A1 | 9/2020 | Lee et al. |
| 2021/0023714 A1 | 1/2021 | Zhang et al. |
| 2021/0141094 A1 | 5/2021 | Russ et al. |
| 2021/0261159 A1 | 8/2021 | Pazhayampallil et al. |
| 2021/0278539 A1 | 9/2021 | Laddha et al. |
| 2021/0304574 A1 | 9/2021 | Ramanathan et al. |
| 2022/0156998 A1 | 5/2022 | Lee et al. |
| 2022/0187461 A1 | 6/2022 | Cullen |
| 2022/0222845 A1 | 7/2022 | Inada |
| 2022/0287676 A1 | 9/2022 | Steines et al. |
| 2023/0003549 A1 | 1/2023 | Paden |
| 2023/0015889 A1 | 1/2023 | Cullen et al. |
| 2023/0034733 A1 | 2/2023 | Cullen et al. |
| 2023/0060421 A1 | 3/2023 | Cullen et al. |
| 2023/0169683 A1 | 6/2023 | Paden et al. |
| 2023/0230212 A1 | 7/2023 | García et al. |
| 2023/0274523 A1 | 8/2023 | Paden et al. |
| 2023/0316657 A1 | 10/2023 | Smits et al. |
| 2023/0360268 A1 | 11/2023 | Cullen et al. |
| 2024/0022819 A1 | 1/2024 | Smits et al. |
| 2024/0040274 A1 | 2/2024 | Smits et al. |
| 2024/0114235 A1 | 4/2024 | Gallagher et al. |
| 2024/0129645 A1 | 4/2024 | Smits et al. |
| 2024/0329248 A1 | 10/2024 | Smits et al. |
| 2025/0027765 A1 | 1/2025 | Paden |
| 2025/0056133 A1 | 2/2025 | Smits et al. |

FOREIGN PATENT DOCUMENTS

| | | |
|---|---|---|
| CN | 112750168 A | 5/2021 |
| CN | 113313710 A | 8/2021 |
| CN | 116829902 A | 9/2023 |
| EP | 4260006 A1 | 6/2022 |
| JP | H06-94428 A | 4/1994 |
| JP | 2009-243986 A | 10/2009 |
| JP | 2018-195240 A | 12/2018 |
| JP | 2020-52719 A | 4/2020 |
| JP | 2020-64011 A | 4/2020 |
| JP | 2020-106475 A | 7/2020 |
| JP | 2021-167776 A | 10/2021 |
| JP | 2024-501078 A | 1/2024 |
| KR | 10-2021-0075563 A | 6/2021 |
| WO | 2013/093459 A2 | 6/2013 |
| WO | 2018/000037 A1 | 1/2018 |
| WO | 2018/125850 A1 | 7/2018 |
| WO | 2019/189381 A1 | 10/2019 |
| WO | 2020/061214 A1 | 3/2020 |
| WO | 2020/080237 A1 | 4/2020 |
| WO | 2021/039022 A1 | 3/2021 |
| WO | 2021/140886 A1 | 7/2021 |
| WO | 2022/132828 A1 | 6/2022 |
| WO | 2023/278868 A1 | 1/2023 |
| WO | 2023/288067 A1 | 1/2023 |
| WO | 2023/009755 A1 | 2/2023 |
| WO | 2023/028226 A1 | 3/2023 |
| WO | 2023/096873 A1 | 6/2023 |
| WO | 2023/164064 A1 | 8/2023 |
| WO | 2023/177692 A1 | 9/2023 |
| WO | 2023/196225 A1 | 10/2023 |
| WO | 2024/025865 A1 | 2/2024 |

OTHER PUBLICATIONS

International Search Report and Written Opinion for International Patent Application No. PCT/US2022/036006 mailed Oct. 4, 2022, 7 Pages.
International Search Report and Written Opinion for International Patent Application No. PCT/US2022/037299 mailed Oct. 25, 2022, 6 Pages.
International Search Report and Written Opinion for International Patent Application No. PCT/US2022/038724 mailed Nov. 1, 2022, 6 Pages.
International Search Report and Written Opinion for International Patent Application No. PCT/US2022/041520 mailed Nov. 8, 2022, 6 Pages.
Office Communication for U.S. Appl. No. 17/876,333 mailed Feb. 21, 2023, 22 Pages.
Office Communication for U.S. Appl. No. 17/876,333 mailed Mar. 1, 2023, 2 Pages.
International Search Report and Written Opinion for International Patent Application No. PCT/US2022/050626 mailed Mar. 7, 2023, 8 Pages.
Office Communication for U.S. Appl. No. 17/895,489 mailed Apr. 11, 2023, 36 Pages.
International Search Report and Written Opinion for International Patent Application No. PCT/US2023/013718 mailed May 30, 2023, 7 Pages.
Office Communication for U.S. Appl. No. 18/130,080 mailed Jun. 20, 2023, 36 Pages.
Office Communication for U.S. Appl. No. 17/895,489 mailed Jul. 5, 2023, 13 Pages.
International Search Report and Written Opinion for International Patent Application No. PCT/US2023/015227 mailed Jun. 27, 2023, 7 Pages.
International Preliminary Report on Patentability for International Patent Application No. PCT/US2021/063399 mailed Jun. 29, 2023, 5 Pages.
International Search Report and Written Opinion for International Patent Application No. PCT/US2023/017271 mailed Jul. 11, 2023, 7 Pages.
Office Communication for U.S. Appl. No. 18/121,486 mailed Aug. 16, 2023, 2 Pages.

(56) References Cited

OTHER PUBLICATIONS

Office Communication for U.S. Appl. No. 18/121,486 mailed Aug. 3, 2023, 11 Pages.
Office Communication for U.S. Appl. No. 18/222,780 mailed Sep. 15, 2023, 10 Pages.
Office Communication for U.S. Appl. No. 18/130,080 mailed Sep. 28, 2023, 43 Pages.
Office Communication for U.S. Appl. No. 18/225,833 mailed Sep. 15, 2023, 19 Pages.
International Search Report and Written Opinion for International Patent Application No. PCT/US2023/028551 mailed Oct. 24, 2023, 09 Pages.
Office Communication for U.S. Appl. No. 17/551,054 mailed Jul. 16, 2024, 12 Pages.
Office Communication for U.S. Appl. No. 17/856,690 mailed Jul. 10, 2024, 11 Pages.
Office Communication for U.S. Appl. No. 17/856,690 mailed Jul. 24, 2024, 4 Pages.
International Preliminary Report on Patentability for International Patent Application No. PCT/US2022/036006 mailed Jan. 11, 2024, 6 Pages.
International Preliminary Report on Patentability for International Patent Application No. PCT/US2022/037299 mailed Jan. 25, 2024, 5 Pages.
International Preliminary Report on Patentability for International Patent Application No. PCT/US2022/038724 mailed Feb. 8, 2024, 5 Pages.
International Preliminary Report on Patentability for International Patent Application No. PCT/US2022/041520 mailed Mar. 7, 2024, 5 Pages.
International Preliminary Report on Patentability for International Patent Application No. PCT/US2022/050626 mailed Jun. 6, 2024, 6 Pages.
Office Communication for U.S. Appl. No. 18/488,123 mailed Jan. 2, 2024, 10 Pages.
Office Communication for U.S. Appl. No. 17/865,794 mailed Aug. 21, 2024, 12 Pages.
International Preliminary Report on Patentability for International Patent Application No. PCT/US2023/015227 mailed Sep. 26, 2024, 5 Pages.
Office Communication for U.S. Appl. No. 18/504,052 mailed Aug. 22, 2024, 7 Pages.
International Preliminary Report on Patentability for International Patent Application No. PCT/US2023/013718 mailed Sep. 6, 2024, 5 Pages.
International Preliminary Report on Patentability for International Patent Application No. PCT/US2023/017271 mailed Oct. 17, 2024, 5 Pages.
Office Communication for U.S. Appl. No. 18/618,909 mailed Nov. 20, 2024, 9 Pages.
Extended European Search Report for European Patent Application No. 21907668.4 mailed on Dec. 6, 2024, 10 pages.
Office Communication for U.S. Appl. No. 18/221,816 mailed Dec. 6, 2024, 27 Pages.
Office Communication for U.S. Appl. No. 18/504,052 mailed Dec. 9, 2024, 6 Pages.
International Preliminary Report on Patentability for International Patent Application No. PCT/US2023/028551 mailed Feb. 6, 2025, 07 Pages.
Office Communication for U.S. Appl. No. 18/221,816 mailed May 14, 2025, 9 Pages.

* cited by examiner

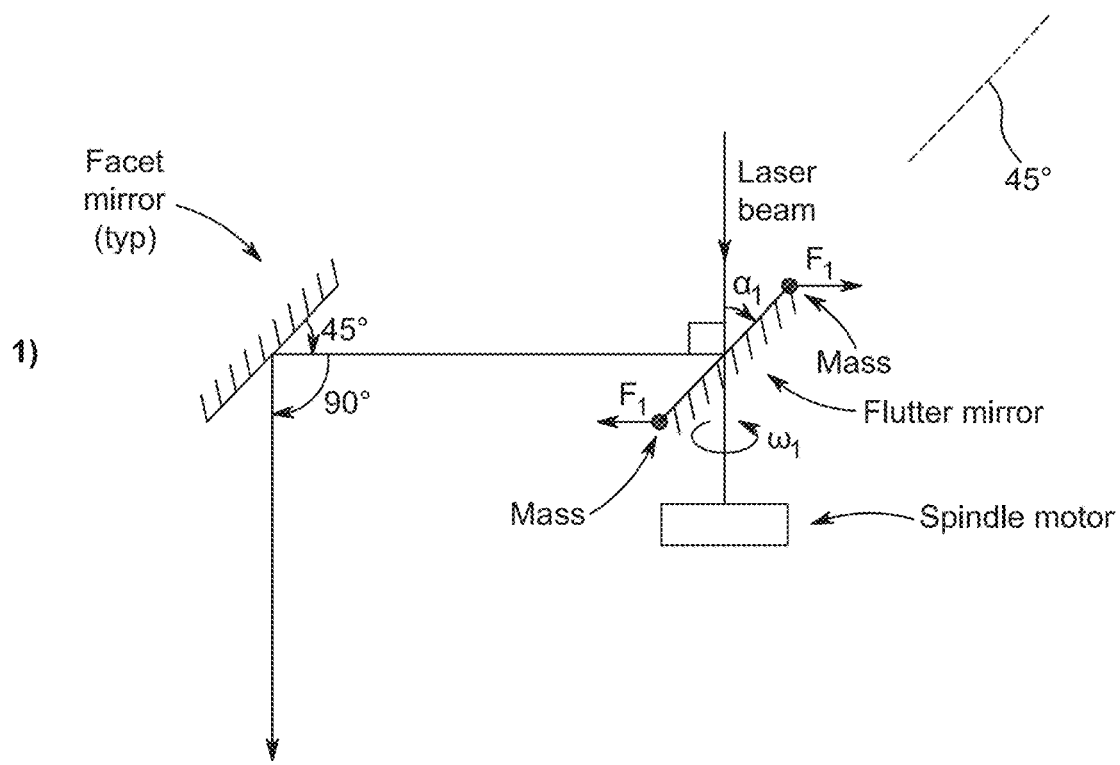
FIG. 3A.1
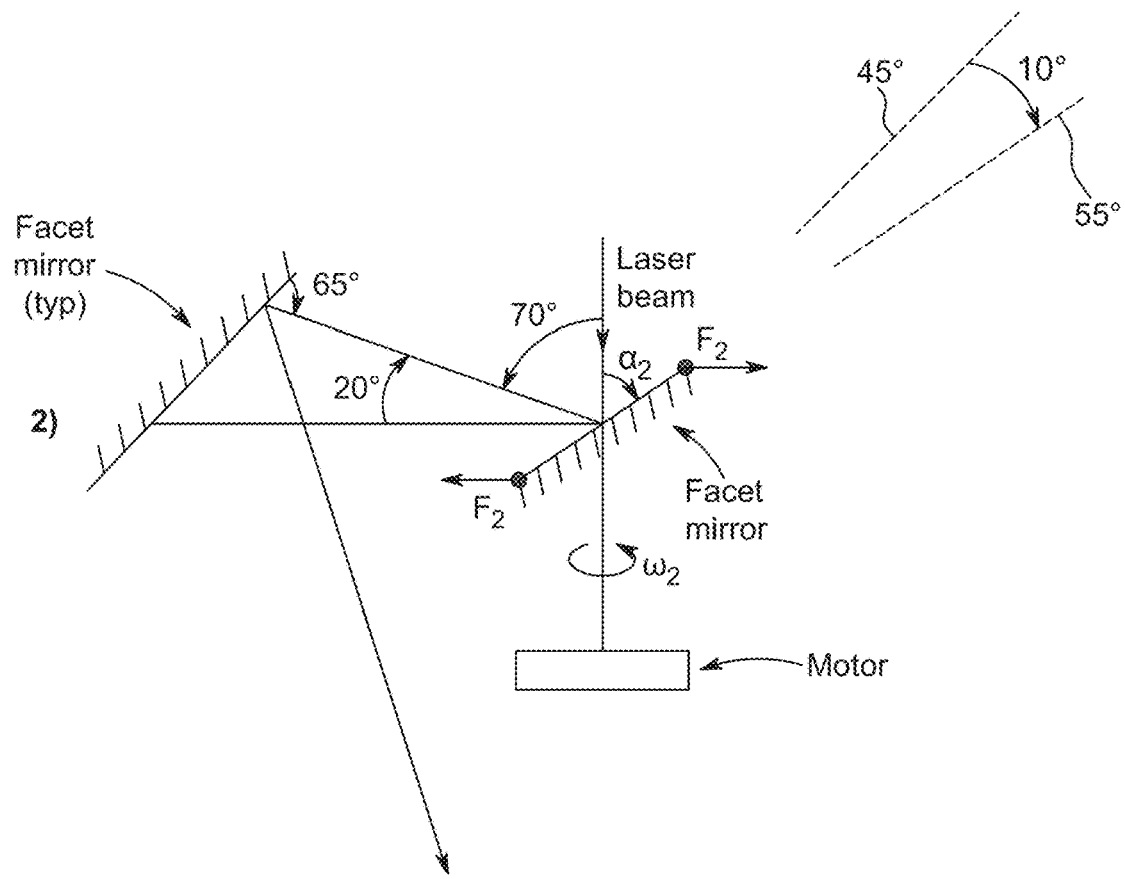
FIG. 3A.2

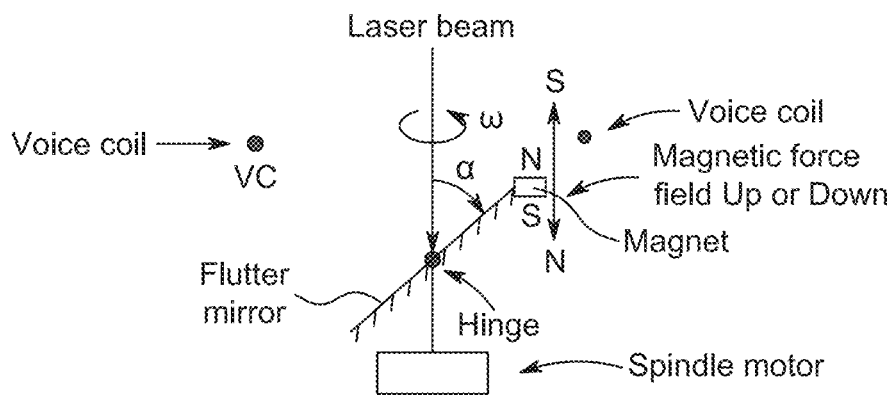
FIG. 3B.1
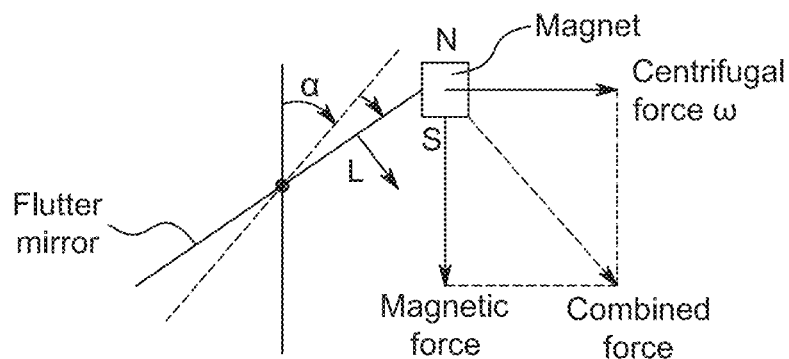
FIG. 3B.2
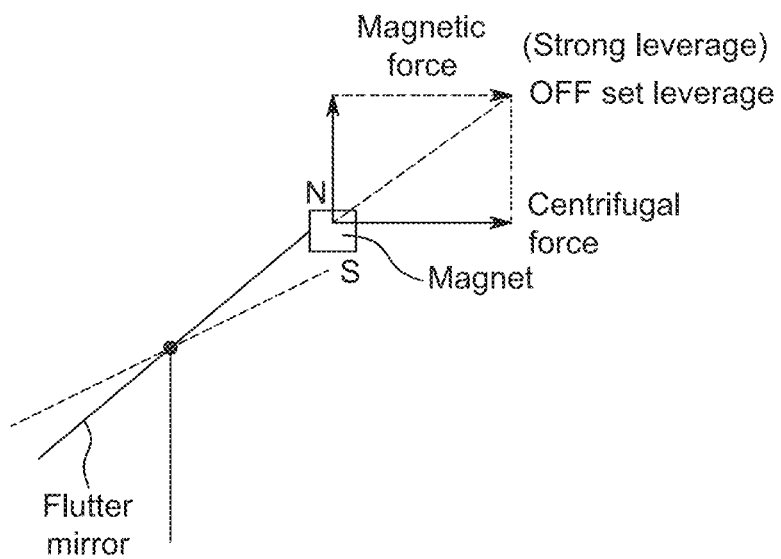
FIG. 3B.3

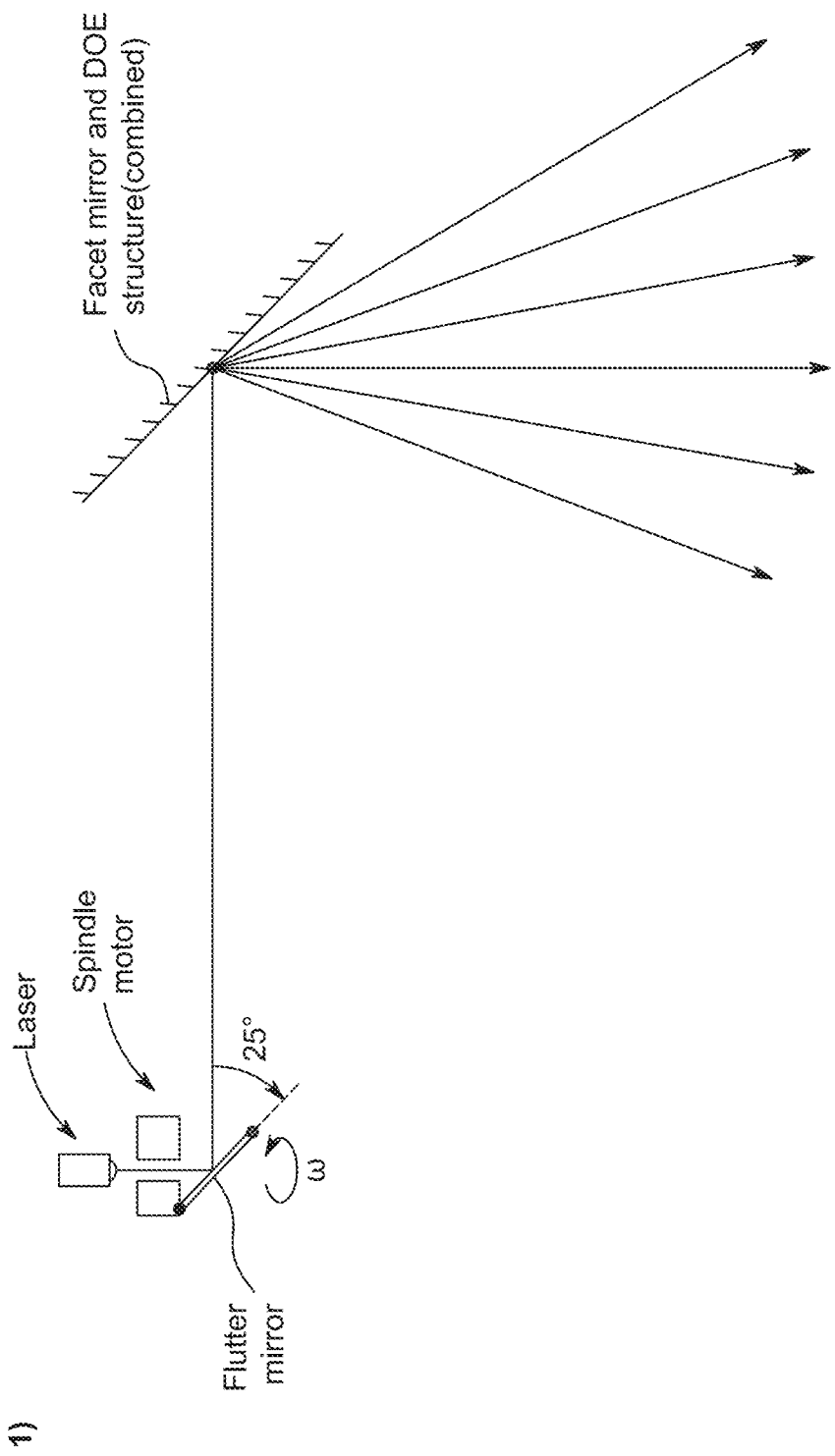
FIG. 3E.1

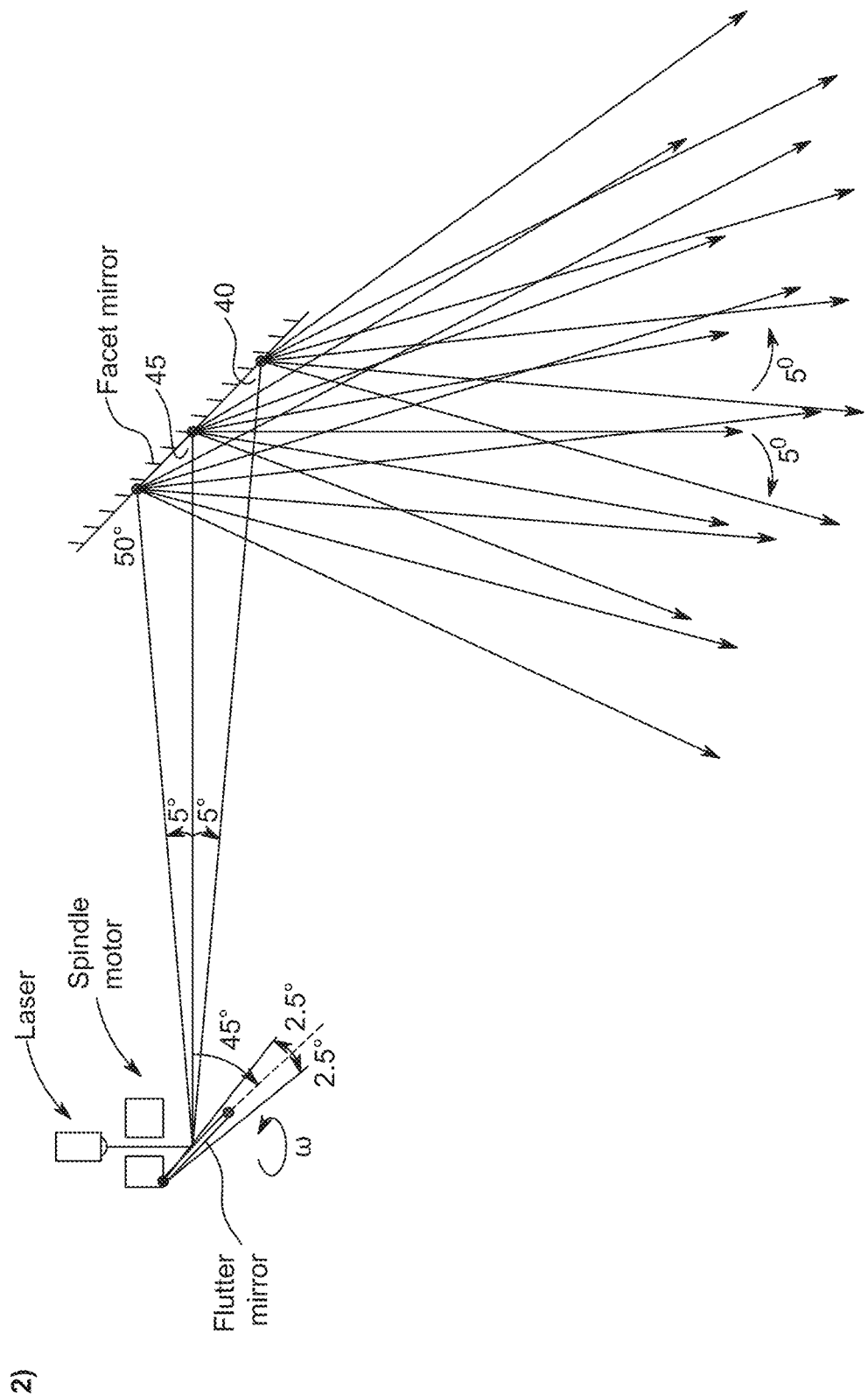
FIG. 3E.2

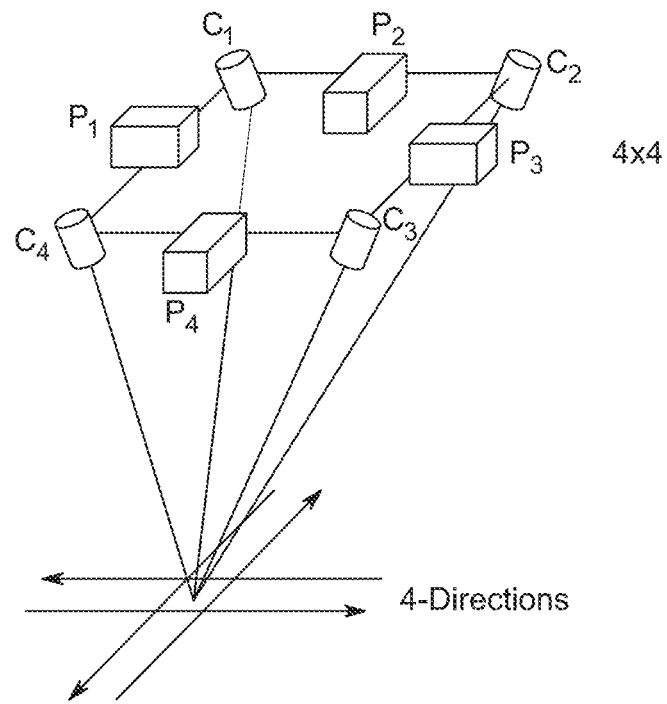
FIG. 4.1
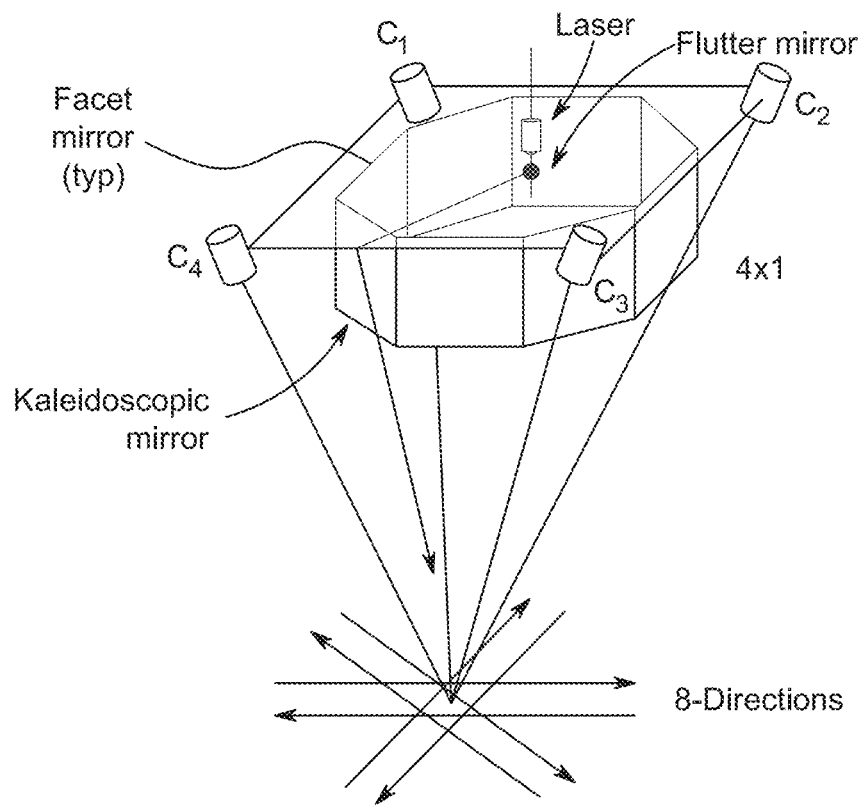
FIG. 4.2

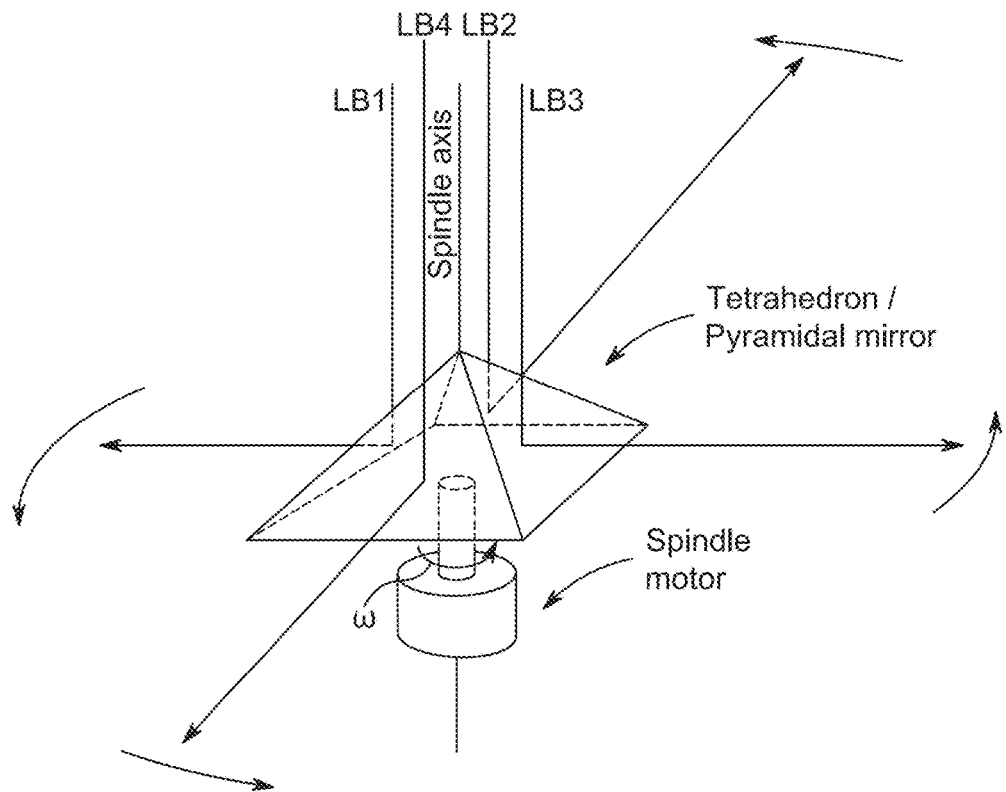
FIG. 5A.1
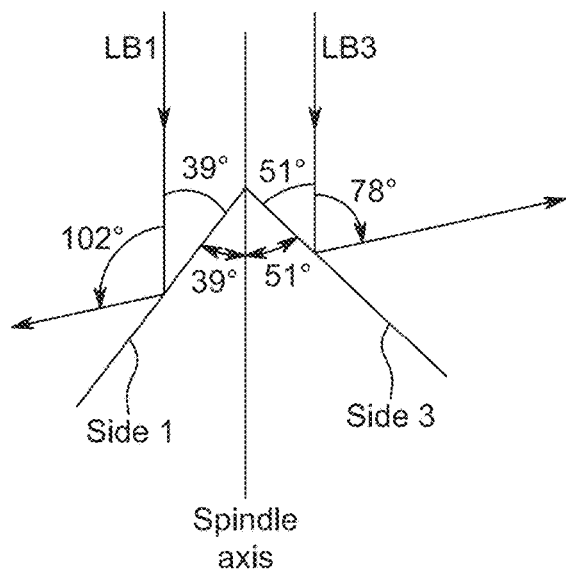
FIG. 5A.2
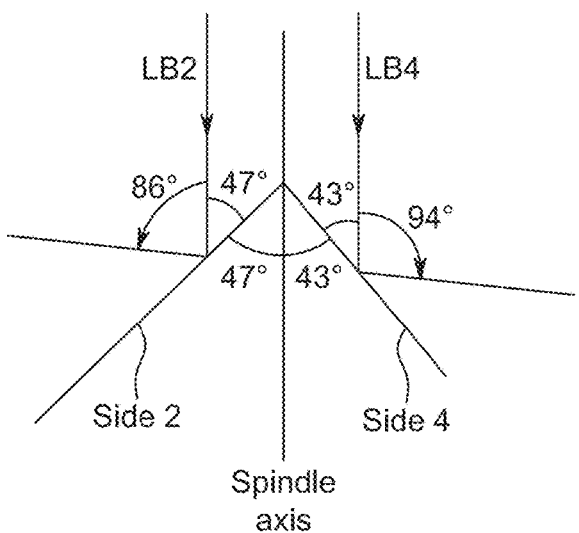
FIG. 5A.3

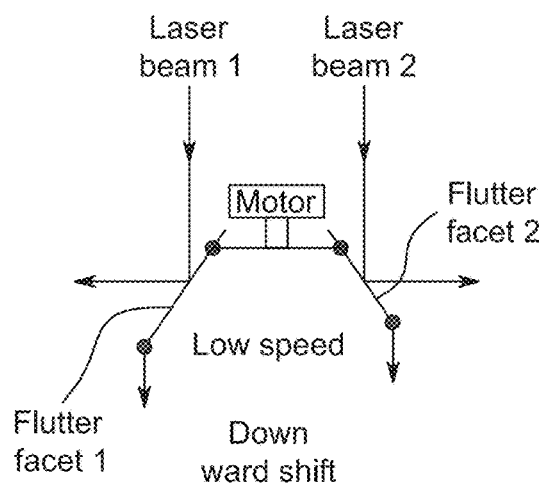
FIG. 5B.1
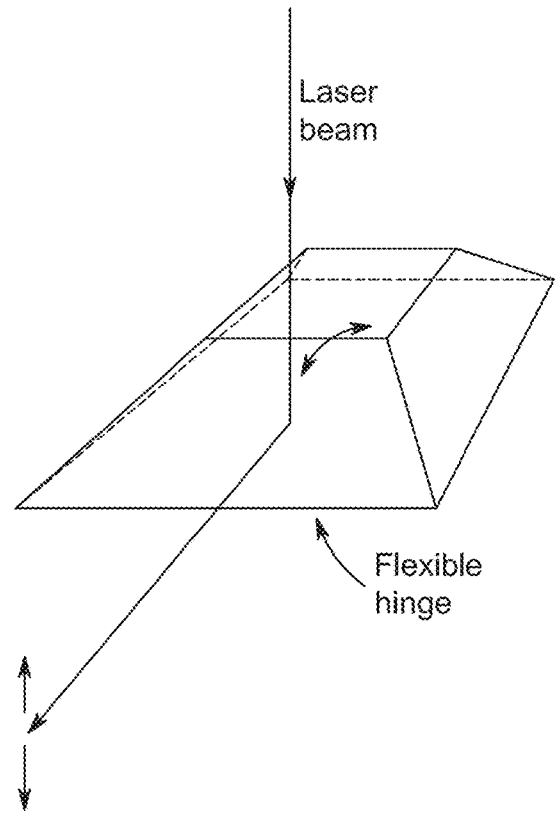
FIG. 5B.3
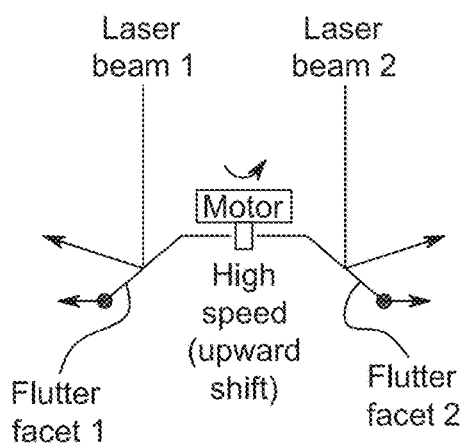
FIG. 5B.2
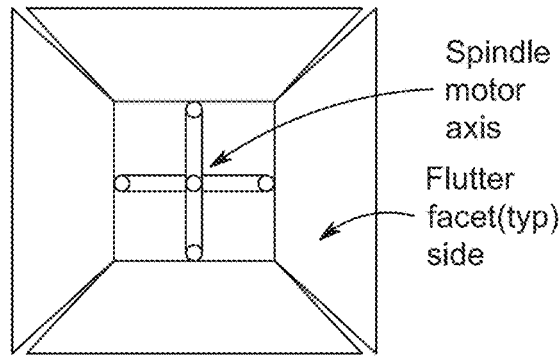
FIG. 5B.4

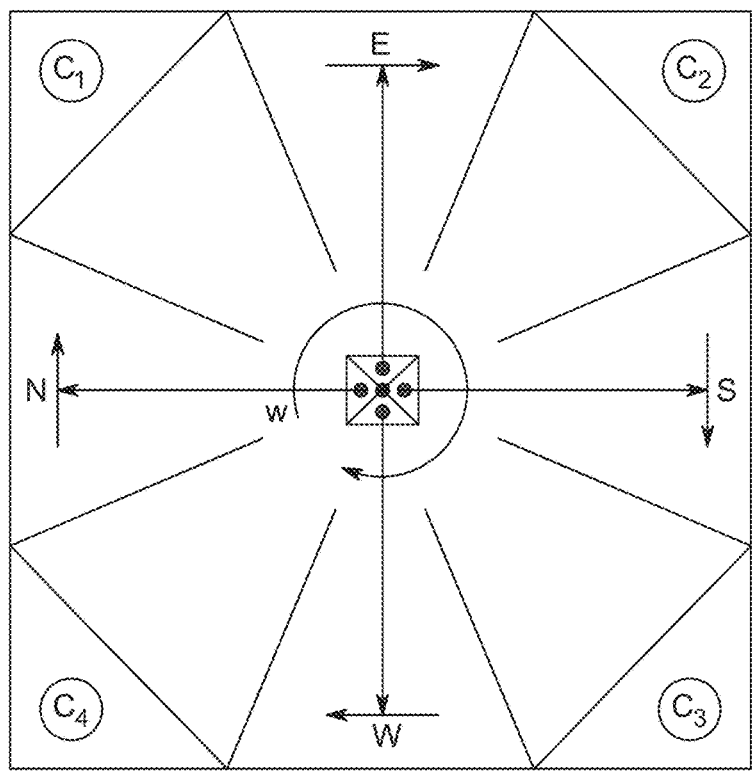
FIG. 5C.1
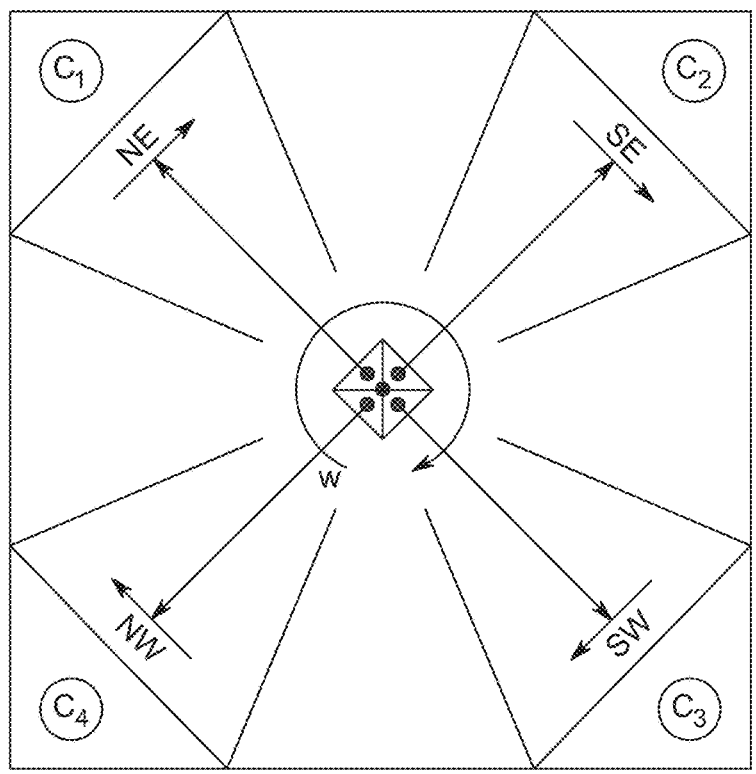
FIG. 5C.2

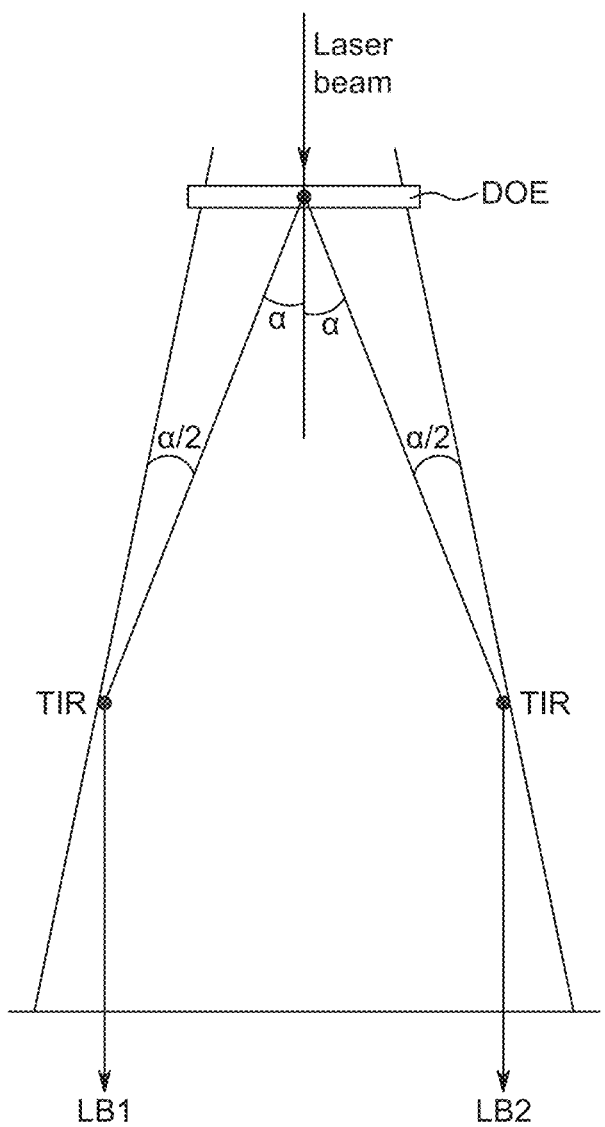
FIG. 6B.1
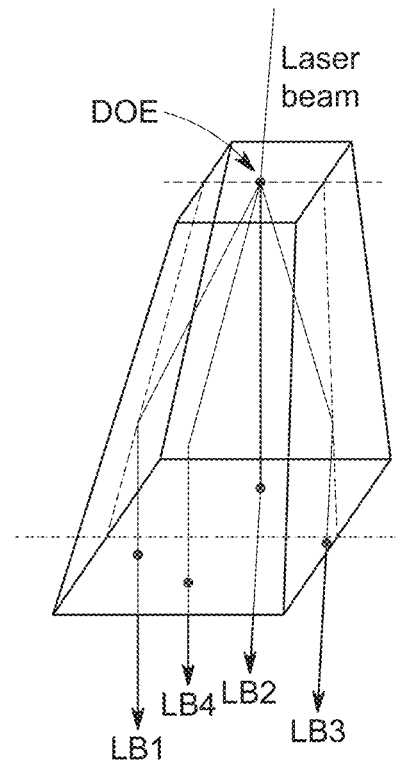
FIG. 6B.2

KALEIDOSCOPIC LASER BEAM PROJECTION SYSTEM

CROSS-REFERENCE TO RELATED APPLICATION

This application is a Utility patent application based on previously filed U.S. Provisional Patent Application U.S. Ser. No. 63/731,484 filed on May 8, 2024, the benefit of the filing date of which is hereby claimed under 35 U.S.C. § 119 (e), and the contents of which is further incorporated in entirety by reference.

TECHNICAL FIELD

The present innovations relate generally to a projector system for a sweeping pattern of laser beams. The pattern is comprised of a diversity of sweep directions scanned by a plurality of reflective facets and a diversity of laser beam emission apertures.

BACKGROUND

Historically, a projector device needed several moving structures configured to emit patterns of sweeping laser beams having a diversity of direction and a diversity of laser beam emission apertures. Consequently, several factors have limited their usage in areas of technology that could benefit from such the projection of highly diverse laser beam patterns. These factors include cost, mechanical reliability, complexity, energy consumption and size.

Consequently, there is an opportunity to mitigate these substantially limiting factors for projector devices that provide diverse laser beam patterns that are significantly less complex and employ as few as one moving structure.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIGS. 3A.1 and 3A.2 illustrate an embodiment of the KLBP system where the operation of a flutter mirror as it moves 10 degrees while spinning around the axis of a spindle;

FIGS. 3B.1, 3B.2, and 3B.3 illustrate different views of an embodiment of the KLBP system where a voice coil (VC) and a magnet may employ an induced magnetic field for angular control of a flutter mirror rotating around the axis of a rotating spindle motor;

FIG. 3E.1 shows an embodiment of a KLBP system where a DOE is embedded in a facet mirror/reflector within the inner cavity of a kaleidoscopic mirror;

FIG. 3E.2 illustrates an embodiment of a KLBP system where the flutter motion of the flutter mirror is +/−2.5 degrees

FIG. 4.1 illustrates an embodiment of a perspective view for a 4×4 KLBP system;

FIG. 4.2 shows an embodiment of a perspective view for a 4×1 KLBP system;

FIGS. 5A.1, 5A.2 and 5A.3 illustrate an embodiment for a KLBP system where an irregular tetrahedral (polygonal) shaped spindle mirror with unequal mirrored/reflective sides is employed to reflect a laser beam at facet mirrors within an inner cavity of a kaleidoscopic mirror (not shown);

FIGS. 5B.1, 5B.2, 5B.3 and 5B.4 show an embodiment for a KLBP system where a tetrahedral shaped spindle mirror with fluttering mirrored/reflective sides is employed to reflect a laser beam at facet mirrors within an inner cavity of a kaleidoscopic mirror (not shown).

FIGS. 5C.1 and 5C.2 illustrate an embodiment of a top view a spinning pyramid shaped spindle mirror that simultaneously reflects four laser beams at facet mirrors within an octagonal shaped kaleidoscopic mirror.

FIG. 6B.1 illustrates a plane view of an embodiment of an enclosure that employs a DOE splitter at a top surface to create two laser beams and the sides of the enclosure are arranged for total internal reflection (TIR) of the two laser beams at angles that redirect the two laser beams to travel in parallel out of a bottom surface of the enclosure;

FIG. 6B.2 shows a perspective view of an embodiment of an enclosure that employs a DOE splitter at a top surface to create four laser beams and the sides of the enclosure are arranged for TIR of the four laser beams at angles that redirect the four laser beams to travel in parallel out of a bottom surface of the enclosure;

DETAILED DESCRIPTION OF VARIOUS EMBODIMENTS

Figure 1:
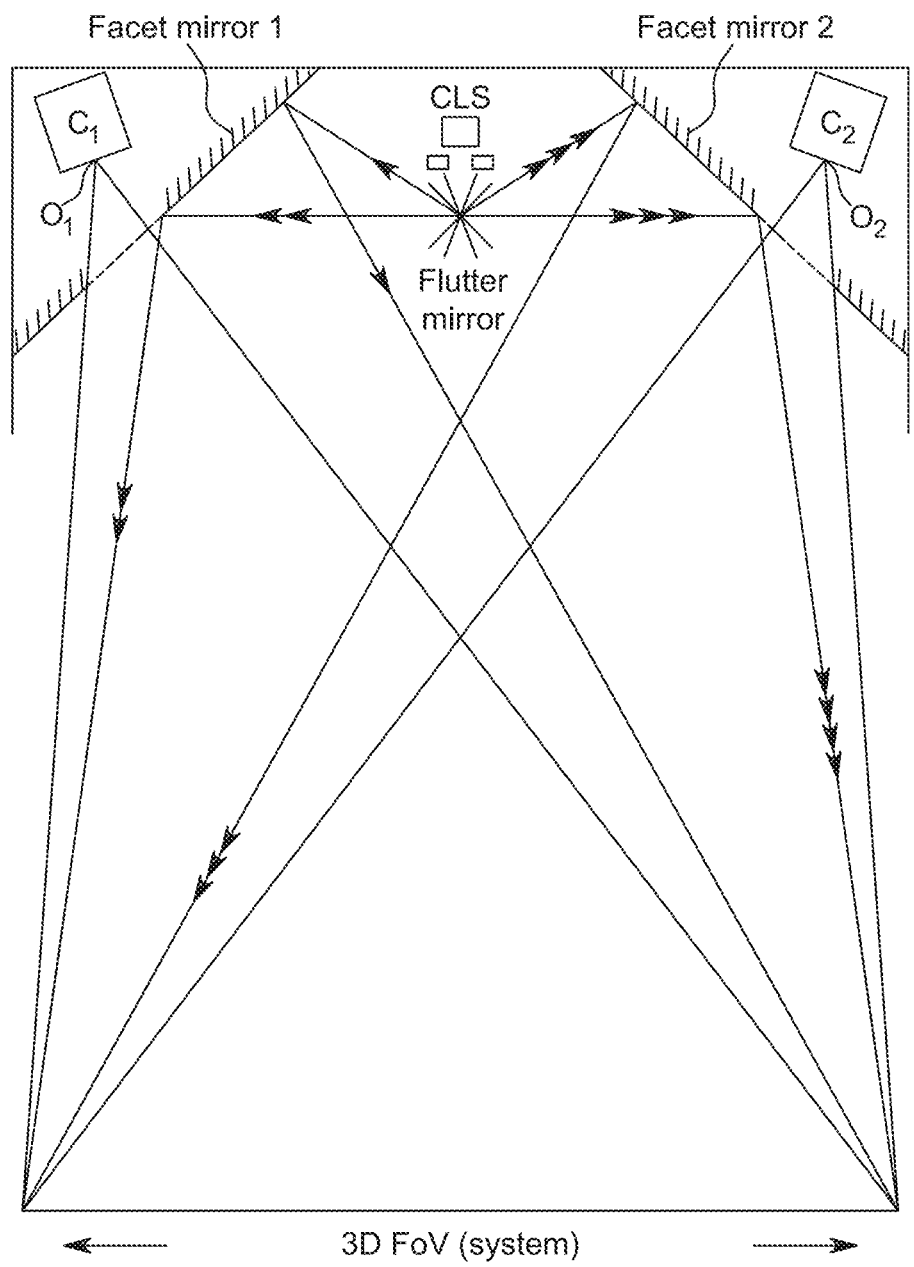
FIG. 1 shows an embodiment for a top view of an exemplary kaleidoscopic laser beam projector (KLBP)

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The various embodiments briefly describe a kaleidoscopic laser beam projector (KLBP) system that creates sweeping patterns of laser beams with diverse sweep directions and emission apertures. The KLBP system may be arranged to utilize a single rotating mirror deflector structure that includes a reflective surface, e.g., a "flutter mirror" or "spindle mirror", that rotates around a spindle axis within a stationary cavity of a polygonal shaped kaleidoscopic mirror having inner surfaces that are lined with a plurality of facet mirrors/reflectors, which are arranged in a concave fashion to outwardly direct reflected laser beams towards one or more remote surfaces and/or objects. For the various embodiments, the common components include: a collimated laser beam source, a spinning mirror deflector (spindle mirror/flutter mirror) and a hollow polygonal shaped kaleidoscopic mirror with internal surfaces lined with facet mirrors.

As the spindle/flutter mirror rotates, it directs reflected laser beams in a radially whirling movement. The surrounding facet mirrors then cut these laser beams into multiple short strokes and redirect them outward in different directions. The KLBP system creates a highly diverse pattern of laser beam trajectories capable of illuminating complex three-dimensional objects from multiple angles simultaneously. In one or more of the embodiments, the spindle mirror may be arranged as a flutter mirror to create controlled angular variations during rotation. Also, one or more diffractive optical elements (DOEs) may be configured to split the laser beams. Additionally, applications for the KLBP system include machine vision systems, precision metrology, gap and flushness inspection, and robot-assisted assembly of complex structures.

FIG. 1 shows a schematic view of a cross section diagram of an exemplary KLBP system arranged for "2×1" stereo or "4×1" (not shown) operation which employs various elements featuring a collimated laser source (CLS), and a "flutter mirror" in the center of the system, surrounded by facet mirrors of a kaleidoscopic mirror (KM) having multiple facets that includes eight facet mirrors but only showing two, i.e, facet mirrors 1 and 2. Objects (not shown) in the three dimensional FoV of the system are scan illuminated from opposing directions and observed simultaneously by at least two cameras ($C_1$ and $C_2$) with optical aperture centers $O_1$ and $O_2$ respectively. (See FIG. 5C for a top view of a 4×1 version of this system.). See FIGS. 5C.1 and 5C.2 for a top view of a 4×1 version of this system.

As shown in FIG. 1, the KLBP is comprised of at least the following elements:

1) A collimated light source (CLS), typically a Laser Diode source, an electrical power circuit that provides a current to this laser diode, and an optical system that will tightly focus that light into a beam. There may be a plurality of such sources in the projector. Alternatively, a single collimated light source (CLS) output beam is split into multiple beams by a Diffractive Optical Element (DOE). See FIGS. 5A, 5B.1, and 5B.2.

2) A spinning mirror deflector (SMD), AKA a "spindle mirror." This is a mirror surface attached to a spinning axis ("spindle") driven by a motor. Various versions of the SMD are described herein, including a "flutter mirror," multi-faceted polygonal deflectors, and beam splitting deflectors.

3) A kaleidoscope mirror that includes a concave arrangement of reflective surfaces, i.e., "facet mirrors" are arranged in a concave fashion around the spindle mirror, so that the laser beam(s), set in a radially whirling movement from the center of this mirrored cavity as they sweep around, get sub-segmented (cut) into multiple short strokes that are then redirected outwards from the KLBP after reflecting off successive mirrored surfaces (facet mirrors).

In one or more of the various embodiments, there may be a great number of such facet mirrors/surfaces (4, 5, 6, 8, 12 or even more). Each facet mirror generates a new outward sweep both different in sweep direction as well as with light impinging with a different angle of incidence onto the mirrored surfaces being scanned.

Figure 2A:
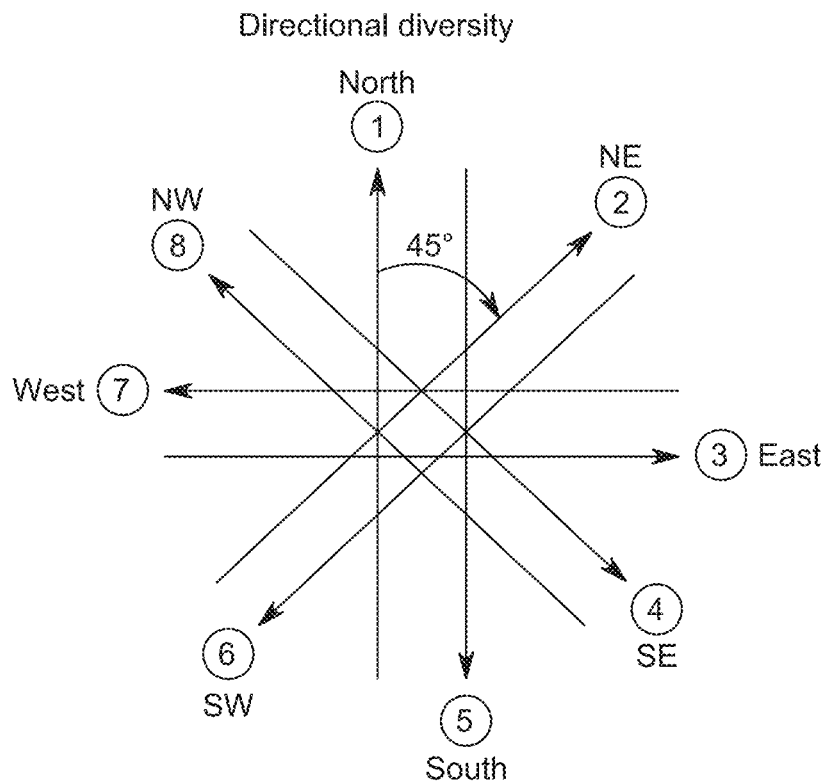
FIG. 2A illustrates an embodiment for a schematic top view of sweep directions for scanned laser beam patterns for a KLBP system that employs an octagonal shaped kaleidoscopic mirror.

FIG. 2A shows scanned laser beam patterns for a KLBP system that employs an octagonal shaped kaleidoscopic mirror. An octagonal fractured interior of the kaleidoscopic mirror has eight facet mirrors/reflectors arranged around a central spindle mirror/reflector. Each facet mirror/reflector reflects up to $\frac{1}{8}^{th}$ of the laser beam circular spin trajectory, or approx. 45 degrees. Facet mirrors that oppose each other create trajectories that appear to sweep in opposing directions. Thus, the patterns of eight successive sweeps can directionally resemble the eight compass directions, each 45 degrees rotated from its neighbor: 1) North, 2) NE, 3) East, 4) SE, 5) South, 6) SW, 7) West & 8) NW. In some cases, actual laser spot surface trajectories may traverse the surfaces in more complex trajectories, depending on the shape and orientations of the 3D surfaces they traverse. Further, the trajectories can be affected by the compound angles of rotation of the spindle mirror, the inclinations of the beam reflecting from it, and the angular orientation of each facet mirror of the Kaleidoscope mirror. A KLBP system may have a number of facet mirrors/reflectors that are greater or smaller than 8.

Figure 2B:
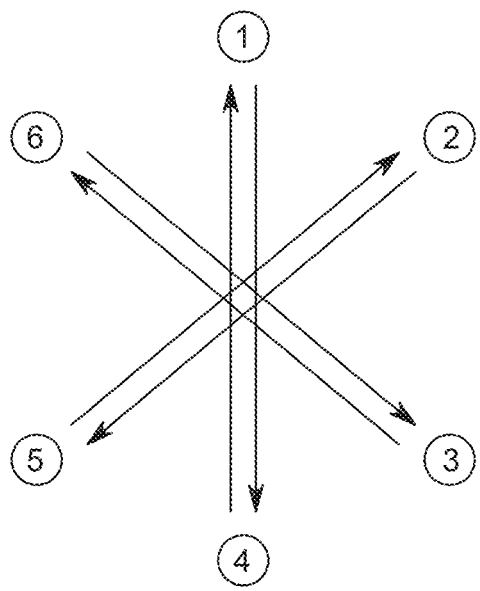
FIG. 2B shows an embodiment for a schematic top view of sweep directions for scanned laser beam patterns for the KLBP system that employs a hexagonal shaped kaleidoscopic mirror.

FIG. 2B shows scanned laser beam patterns for a KBLP system that employs a hexagonal shaped kaleidoscopic mirror to generate six sweeps for two opposing trajectories in three orientations that are 60 degrees apart. Another arrangement of a KLBP system might have an odd number, and uneven sized facet mirrors, and the facets might not form a closed concave dome shape. In that case, there may be gaps between the edges of facet mirrors and "peepholes," small apertures in the facet mirrors through which sensors, e.g., cameras, may view the scanned surfaces, or for laser beams to enter the interior cavity of a kaleidoscopic mirror. Any number of sweep lengths and sweep direction combinations can be arranged by changing the geometry of the faceted mirrors/reflector surfaces that make up the kaleidoscope mirror.

Figure 2C:
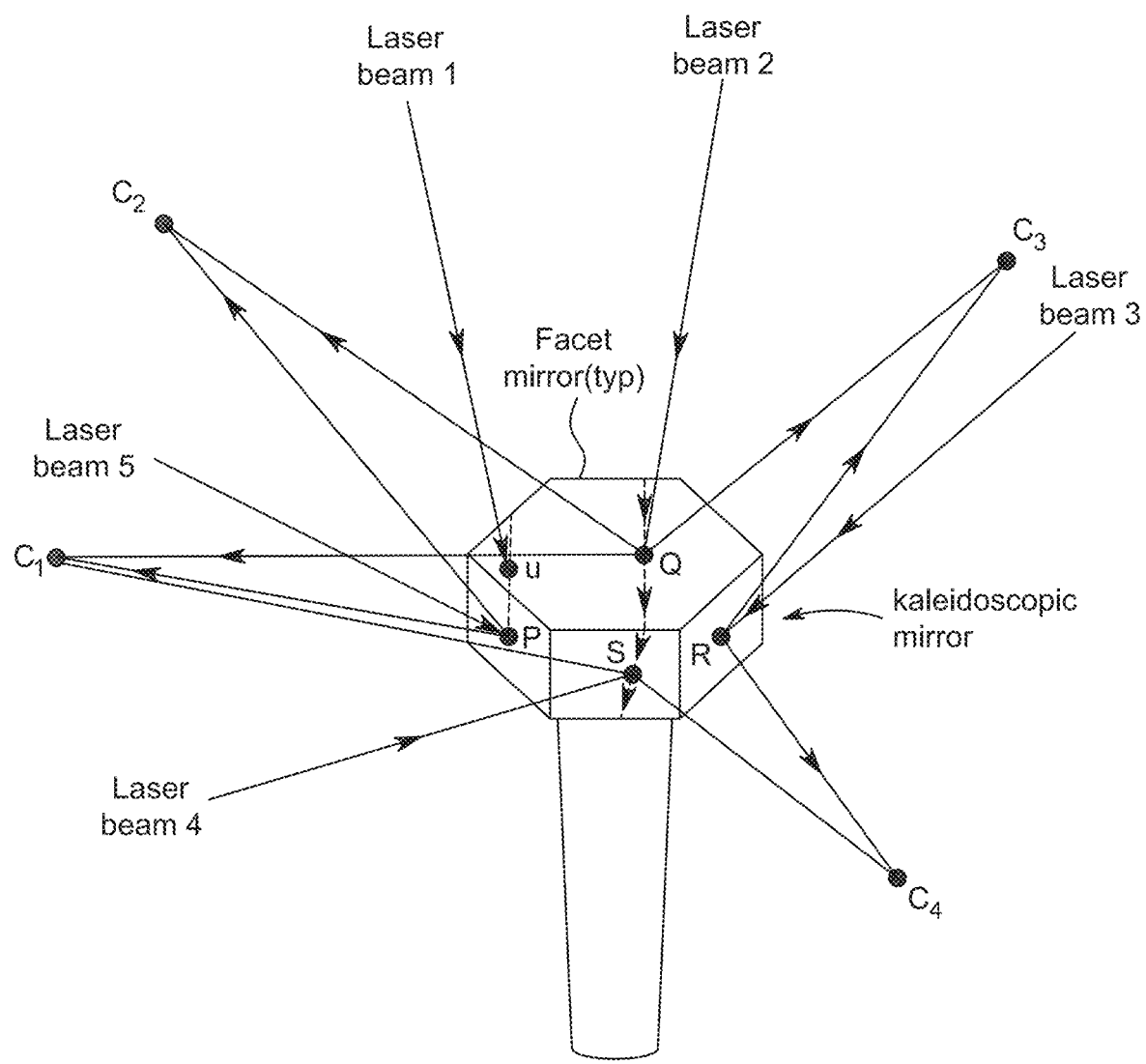
FIG. 2C illustrates an embodiment for beam incidence diversity of a kaleidoscopic mirror that includes a wide "cup" of facet mirrors that reflect the laser beams swirling from the central spindle/flutter mirror.

FIG. 2C illustrates an embodiment showing the beam incidence diversity of a kaleidoscopic mirror that includes a wide "cup" of facet mirrors that reflect the laser beams swirling from the central spindle/flutter mirror. The wide cup of the kaleidoscopic mirror results in a large diversity of laser beam incidence, with sweeping beams that may impinge on a complex 3D shaped object from a wide variety of angles. This embodiment is particularly useful when there is a need for machine vision or a robot guidance system to simultaneously observe opposing sides of an object, such as e.g. the top and six faces of a hexagonal head of a bolt. This figure illustrates how in a 4×1 KBLP tool guidance machine vision system a minimum subset of two out of a total of four cameras ($C_1$, $C_2$, $C_3$ & $C_4$) can observe spots P, Q, R, S & U projected by laser beams I, II, III, IV & V simultaneously scanning in five directions across five different angular features of the bolt.

FIGS. 3A.1 and 3A.2 illustrate the operation of an embodiment of a KLBP system with a flutter mirror that moves 10 degrees while spinning around the axis of a spindle. Although not shown, the flutter mirror may be a single mirror or a set of mirrors attached to a spindle motor axis that redirects a laser beam or a set or laser beams in a circular fashion, and in which an angle of redirection may be changed "mid-flight" at any time during the spinning motion. Although not shown, a flutter mirror may be arranged to move a mirror or a set of mirrors around two different axes of rotation at the same time with a single spindle motor.

FIG. 3A.1 shows an embodiment for a single laser beam impinging on a flutter/spindle mirror with a reflective surface that is angled at 45 degrees ($\alpha_1=45°$ from the axis comprising the spindle motor's axis of rotation. The flutter/spindle mirror is spinning at a rotational velocity $\omega_1$. After a laser beam reflects off the rotating flutter/spindle mirror the beam sweeps horizontally outwards towards one of the Kaleidoscopic mirror's facet mirrors/reflectors. The latter mirror surface redirects the sweeping laser beam downwards towards a surface being scanned. The small eccentric masses at the ends of the hinged flutter/spindle mirror exert certain centrifugal forces (F1) that act to pull the flutter mirror towards a horizontal orientation in its hinge. The hinge has a spring (not depicted here) that counteracts these centrifu-gal forces. The net angle of redirection that the flutter/spindle mirror effects is 90 degrees ($2\times(90°-\alpha_1)=2\times(45°)=90°$).

FIG. 3A.2 shows an embodiment when the spin rotational velocity $\omega_2$ has increased, and the centrifugal forces ($F_2$) are increased, and as a result the flutter/spindle mirror angle $\alpha_2$ has increased by 10 degrees from 45 degrees to 55 degrees. The reflected laser beam angles upwards by 20 degrees, and the trajectory of the spot sweeping the surface being scanned changes by 20 degrees. The net angle of redirection that the mirror effects is 70 degrees ($2\times(90°-\alpha_2)=2\times(90°-55°)=70°$). Further notice that the flutter angle change also results in a lateral shift of the scanned laser beam. This ability for laser beams to shift laterally during scanning is useful and beneficial when illuminating a complex 3D shape such as a wire harness, where typically conventional laser light systems might cast large shadows that prevent surfaces from being fully scanned and thoroughly inspected.

Figure 3C:
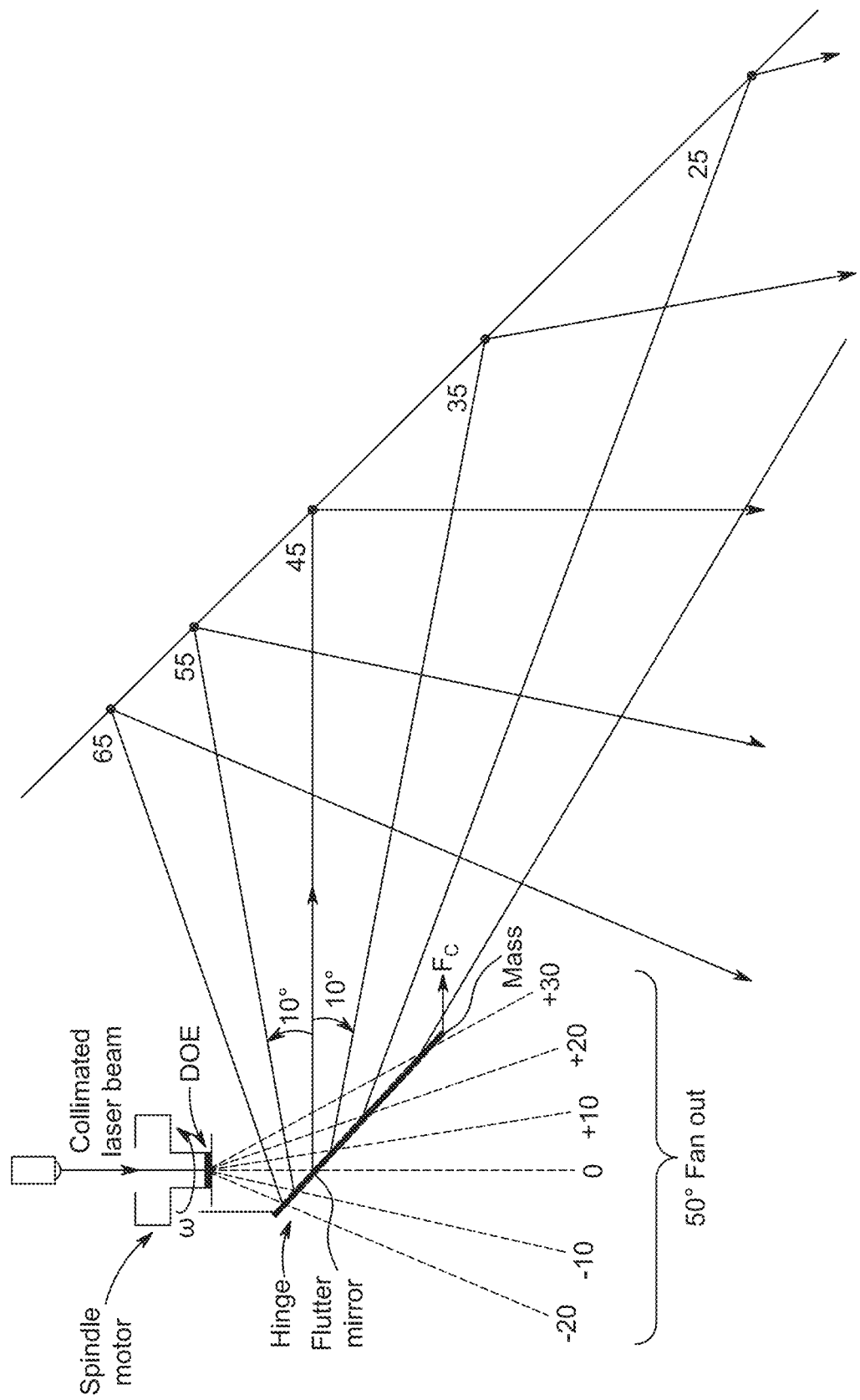
FIG. 3C shows an embodiment for a KLBP system where a diffractive optical element (DOE) is employed as a laser beam splitter for directing a plurality of beams onto a reflective surface of a rotating flutter mirror.

FIG. 3C shows an embodiment for a KLBP system where a diffractive optical element (DOE) is employed as a laser beam splitter for directing a plurality of beams onto a reflective surface of a rotating flutter mirror. A collimated laser beam is arranged to be in the center opening of a spindle motor. The rotating spindle assembly is comprised of a spindle mirror attached to a sprung hinge allowing its inclination angle to change during rotation as described before (see Flutter Mirror). A DOE is placed in front of the flutter mirror. As depicted the DOE splits the impinging laser beam into six beams that fan out over 50 degrees (this fan-out is arbitrary, and it might be much smaller). The six beams, after reflecting off the flutter mirror surface, impinge each onto a succession of Kaleidoscopic mirror's facet mirrors/reflectors.

Figure 3D:
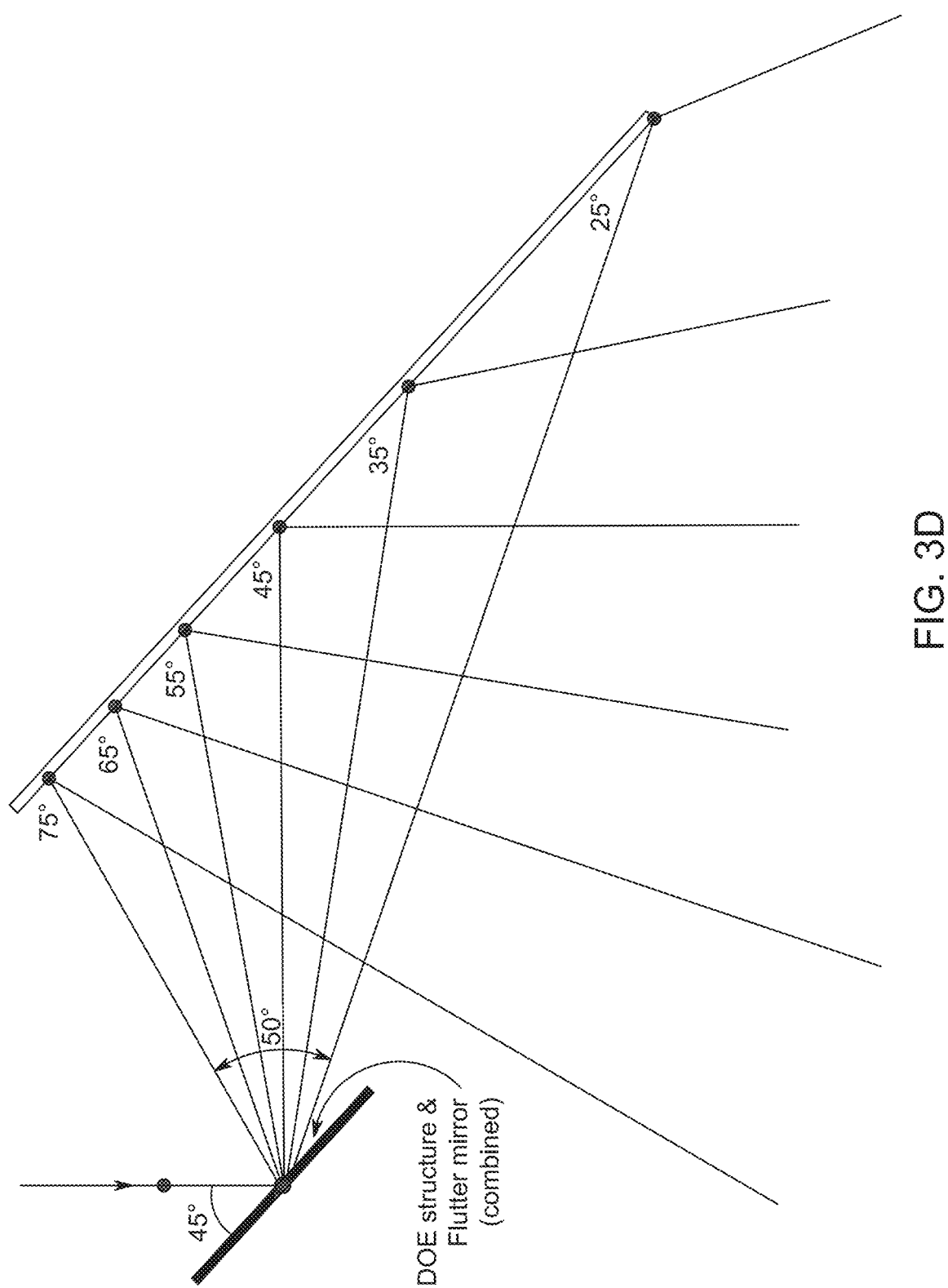
FIG. 3D illustrates an embodiment of a KLBP system where a DOE is embedded in a flutter mirror's reflective surface.

FIG. 3D illustrates an embodiment of a KLBP system where a DOE is embedded in a flutter mirror's reflective surface. In this illustration, the spindle motor is not shown to improve clarity. The DOE is integrated in the top reflective surface of the flutter/spindle mirror, making the rotating mirror more compact. The DOE may include one or more types of reflective diffractive optics such as diffractive gratings. Also, for a wide fan-out (as depicted here), the inner cavity of the kaleidoscopic mirror is likely to be relatively larger than another without the embedded DOE.

FIG. 3E.1 shows an embodiment of a KLBP system where a DOE is embedded in a facet mirror/reflector within the inner cavity of a kaleidoscopic mirror. In this way, a size of the inner cavity of the kaleidoscopic mirror may be reduced.

FIG. 3E.2 illustrates an embodiment of a KLBP system where the flutter motion of the flutter mirror is +/−2.5 degrees. In this way, six beam fan-out moves +/−5 degrees, thus the approximate 10-degree gap spacing between the six beams can be filled.

Figure 3F:
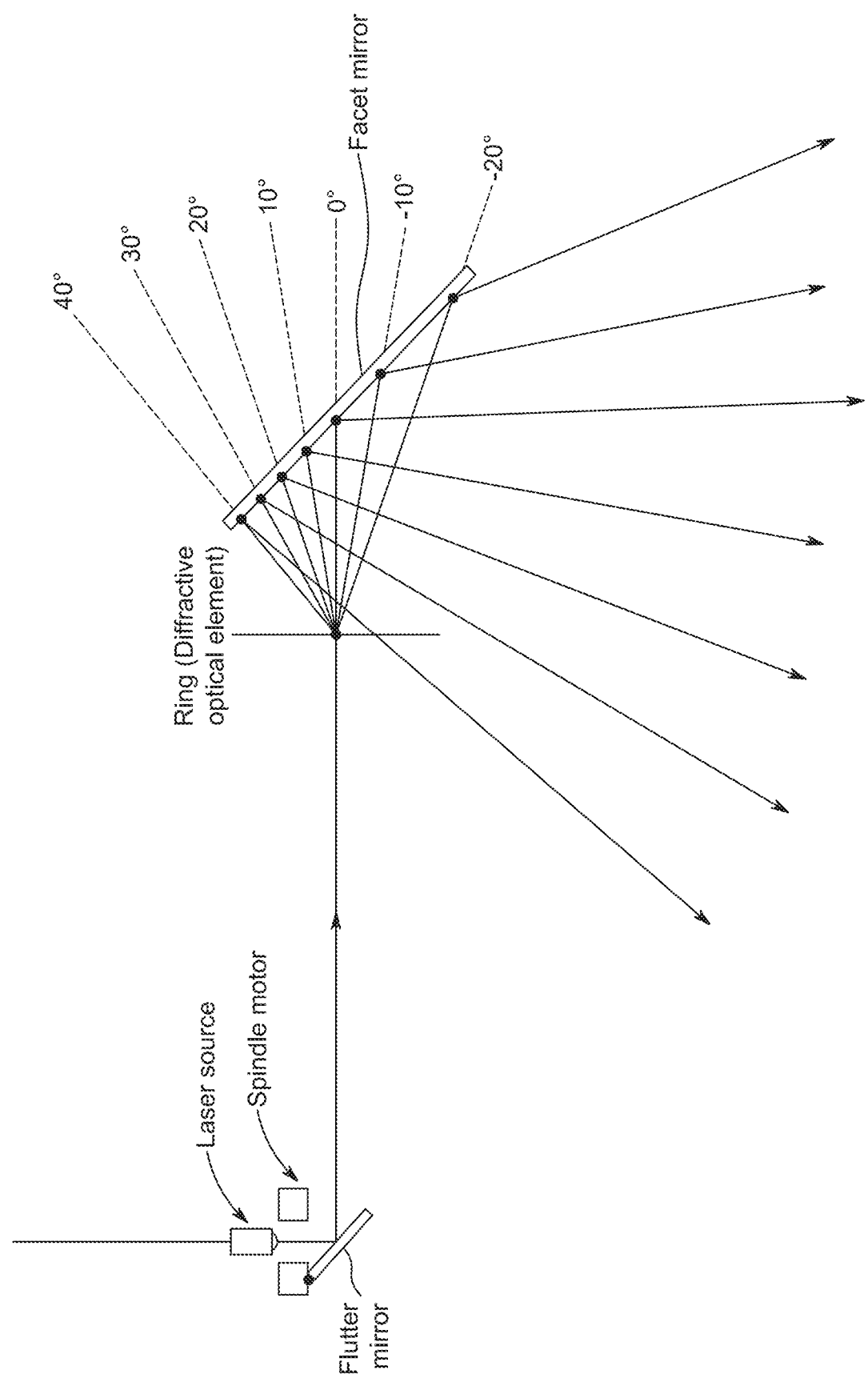
FIG. 3F shows an embodiment of a KLBP system where a DOE is interposed cylindrically around the flutter mirror.

FIG. 3F shows an embodiment of a KLBP system where a DOE is interposed cylindrically around the flutter mirror. Transmissive DOE structures can be produced on a thin film, which may be used to create a cylindrical shape. This DOE film may be placed cylindrically around the spindle motor mechanism, and thus interposed, before the swirling "master" beam reaches the facet mirrors of the kaleidoscopic mirror. One advantage of this arrangement can be that the three components: 1) the spindle mirror motor and laser beam assembly, 2) the DOE and 3) the kaleidoscopic mirror structure can be modular components that can be mixed and matched into a variety of desirable but quite different scan system configurations.

Figure 3G:
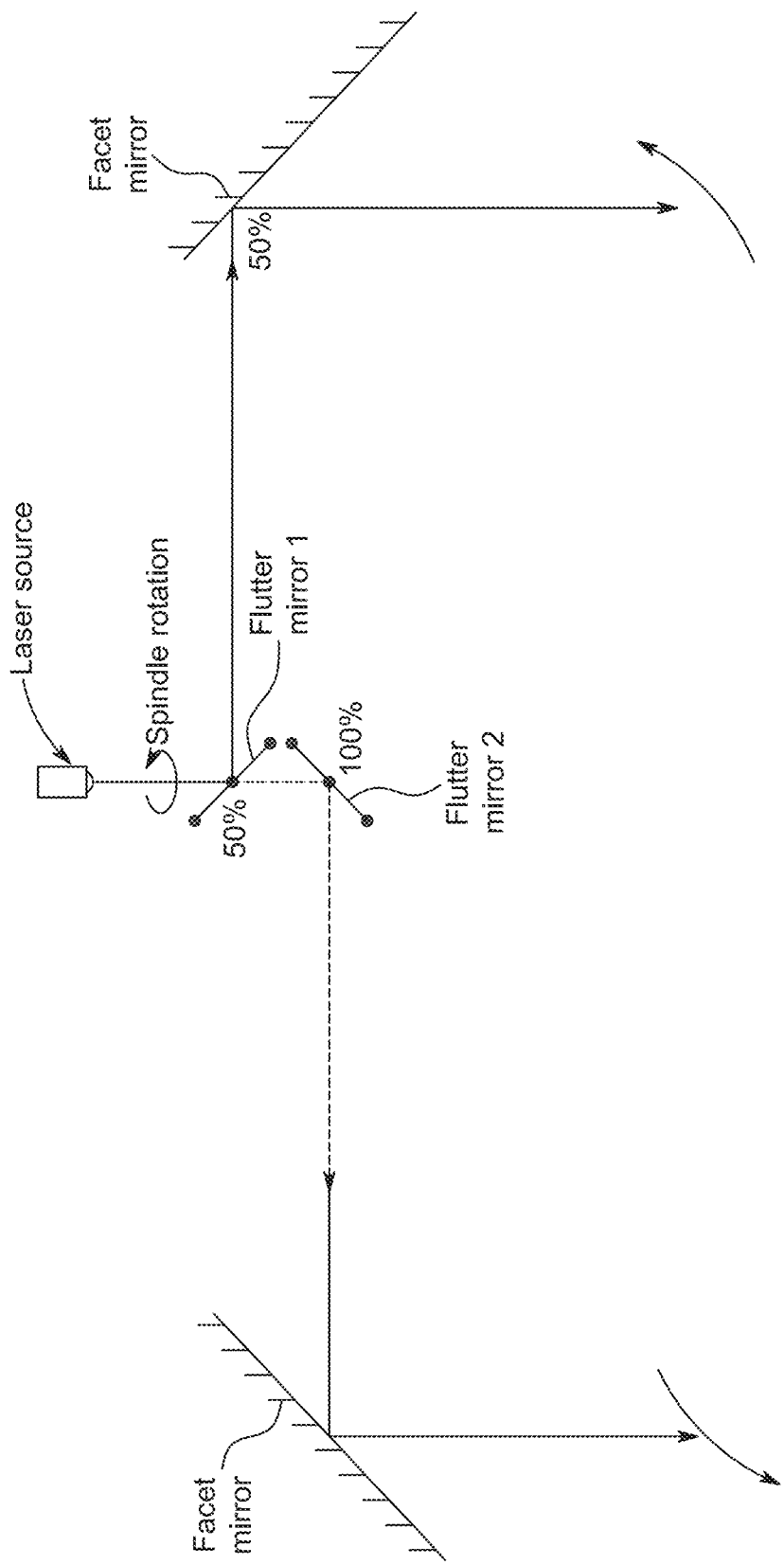
FIG. 3G illustrates an embodiment of an embodiment of a KLBP system with a two-sided (dual flutter mirrors) rotating reflective structure.

FIG. 3G illustrates an embodiment of a KLBP system with a two-sided (dual flutter mirrors) rotating reflective structure. For certain applications, such as 3D object segmentation, it may be beneficial that two or more spot trajectories of two or more beams cross on a surface within a relatively short observation time e.g. within 3 milliseconds. In this case, having two or more laser beams concurrently radiate out from the same spindle/flutter mirror mechanism may be useful. In one of the various embodiments, a central collimated laser beam is arranged to impinge on two successive flutter mirror surfaces/spindle mirrors that deflect portions of that same laser beam into substantially different directions, so that these fractional beams simultaneously reflect off different facet mirrors around the inner cavity of the kaleidoscope mirror, resulting in crossing scan beam trajectories.

FIG. 4.1 illustrates an embodiment of a perspective view for a 4×4 KLBP system. Also,) FIG. 4.2 shows an embodiment of a perspective view for a 4×1 KLBP system. As described earlier the KLBP system enables a "less is more" system. However, as shown in FIG. 4.1, a 4×4 system requires four projectors each with a 20 faceted spinning polygon mirror requiring an additional motorized "wobble mirror". Thus, two motors, two fairly large moving parts, that are hard to configure or reduce in size because of the fundamental geometry of diverse alignment angles between the lasers relayed between two moving mirrors.

Also, as illustrated in FIG. 4.2, a 4×1 KLBP system requires one small spinning part, i.e., the flutter mirror/spindle mirror. Also, a multifaceted reflective polygon (kaleidoscopic mirror) does not need to move, just the flutter mirror. The traditional 4×4 projection system is turned inside out by the 4×1 system because it is illuminated from its own center by the flutter/spindle mirror. Moreover, the 4×1 system can scan in not just four directions but eight directions. Furthermore, the function of the "wobble mirror" has been integrated into the spindle/flutter mirror itself and can be controlled with the same single motor. Thus, seven motors and up to eleven lasers have been eliminated from a traditional 4×4 projector design by the innovative 4×1 KLBP system. It has at least 18 fewer components that can support an even more diverse set of scanning requirements and applications.

The benefits of the various embodiments may include the following.

1) The simplicity of just one moving part, a single motor. This innovative simplicity of design replaces historical "4×4" scanning system that required a total of eight moving structures driven by eight motors, for a total of four laser beam projectors. The various embodiments enable a lighter, more compact, more energy efficient, more reliable and more economical "4×1" system configuration. See FIG. 4.1 for perspective view of the historical 4×4 system and FIG. 4.2 for a perspective view of the innovative 4×1 system.

2) Another benefit includes modular configurability. For example, a kaleidoscopic mirror/reflector can be manufactured relatively inexpensively from molded plastic, folded plate metal, or cast aluminum. The size, shape and orientation of the facet mirror/surfaces can be customized, or adjusted as needed, without requiring any change to the rest of the system. See FIG. 7.

3) As shown in FIGS. 2A and 2B, a great diversity in sweep directions can be generated, which is beneficial e.g. in metrology applications when critical edge features need to be measured with the greatest precision. A good example of the need for this is in Gap and Flushness (G&F) metrology inspection, where the inspecting, e.g. the gap around a headlight assembly, requires the robot to follow a complex stop and go, 6D spatial trajectory. A machine vision or tool guidance system outfitted with the Kaleidoscopic Laser Scanner (KLS) scans, detects and measures gaps simultaneously along 8 different laser scan directions, with 4 to 8 laser beams emanating from the scan head simultaneously. Thus, the robot arm can "fly" across the surfaces without needing to adjust its orientation with respect to the gap's orientation. This simplifies the robots' actions and significantly shortens the time required to perform the scan, and it enables more features to be scanned in higher resolution during the available time in an assembly line workstation.

4) As shown in FIG. 2C, a great diversity in beam incidence into the volumetric space of interest can be created. Just as when lighting a stage, the more light sources are available, the better. Thus, when scanning a complex three-dimensional (3D) structure, this diversity of beam incidence is highly beneficial, sometimes crucial, to ensure that a sufficiency of coverage is achieved, and that enough of the complex shaped 3D surfaces are properly illuminated during the scan. When assembling complex 3D structures such as wire and connector PCB assemblies or electrical vehicle (EV) assemblies, the diversity of beam angle incidence ensures that all surfaces of the components are lit so they can be carefully inspected for compliance and dexterously handled by robots during assembly.

In one or more of the various embodiments, a type of spinning mirror deflector (SMD), AKA "flutter mirror" may be employed. A flutter mirror operates like the wings of a butterfly as it moves quickly yet lightly and silently during rotation by the spindle motor. This slight angular motion is around an axis of rotation that is substantially orthogonal to the axis of spin.

As shown in FIGS. 3A.1 and 3A.2, the flutter motion is driven by the centrifugal forces acting on a slightly unbalanced, eccentric mass of the spinning mirror assembly. In the various embodiments, the flutter mirror may be designed so that its center of mass is eccentric from the mirror axis of spin, or a small mass is attached to the flutter mirror. In one or more of the various embodiments, there may be a flexure or hinge that both holds the flutter mirror in place and also enables a small variance in angular position of the mirror, i.e. a hinge motion or flexure bending of the flutter mirror.

Additionally, the centrifugal force experienced by the eccentric mass of the flutter mirror depends on its mass as well as the spin rotational speed ($@$). In the case of a flexure, as the spindle speed increases, the flexure will bend more as it experiences a greater centrifugal force. An increase in the flutter mirror's inclination angle ($\alpha$) can result in the laser beam reflecting on it by twice that angle ($2\alpha$).

As shown in FIG. 3C, a spray or bundle of N laser beams emanates from the spindle/flutter mirror, swirling towards N facet surfaces/mirrors of a kaleidoscopic mirror. Maybe N=6, i.e. there are 6 beams, each 10 degrees apart that may fully cover a 60 degree wide swath of a surface with the reflected beams of the collimated laser beam, without gaps. In such a case, with a periodic flexure motion (a) of just +/−2.5 degrees, it can be sufficient to close the gaps between reflected laser beams and with just six reflected beams a full 60 degree wide strip could be covered.

In one or more of the various embodiments, a resonant flutter mirror may be provided that can be arranged for periodic maximal resonant flexure motion. The resonant flutter mirror may be configured so that the mirror and a flexure form a sprung mass flutter mirror assembly that may be set into oscillation. By choosing an appropriate mass, a mass eccentricity and a suitably stiff spring, the flutter mirror assembly can have a certain harmonic oscillation frequency ($f_{ho}$). Analogous to pushing a child on a swing, by choosing a "right" frequency and a phase of excitation, a resonant oscillation can be set in motion for the resonant flutter mirror and maintained with a negligible use of energy.

In one or more of the various embodiments, it may be desirable to not fill the gaps between scan lines of reflected laser beams but to just shift the scan line trajectory slightly. Two potential ways to achieve this result include, but are not limited to:

a) If the flexure or hinge has a known deflection response to the centrifugal force it is experiencing, then a small adjustment of the spindle speed (ω) can result in a small lateral shift of N reflected laser beam trajectories; and b) Alternatively, an additional force might be imparted on a spinning flutter mirror, and using this additional force the mirror's inclination angle may be changed during the spin, without requiring a variance of spindle speed.

For one or more of the various embodiments, the latter version (b) is illustrated in the three examples shown in FIGS. 3B.1, 3B.2, and 3B.3. As shown in FIG. 3B.1, voice coil (VC) may be mounted right above the spindle/flutter mirror with a center of the circular coil aligned and concentric with the spindle axis. In this way, when a current (I) is run through the VC, a magnetic field is induced by the circular current in the VC. This induced magnetic field is substantially parallel with the spindle axis.

As shown, a small magnet may be attached to the hinged and sprung spindle/flutter mirror. The magnet's magnetic field is substantially aligned along the same axis as the VC and the spindle/flutter mirror axis. When the current is turned on, the induced magnetic field created by the VC can exert an upwards or downwards force on the magnet. The direction and magnitude of the exerted force would depend on a direction and a magnitude of the current circulating in the VC. Additionally, since the magnet also has a mass, it can also experience a centrifugal force which is directed outward, orthogonal from the spin rotational axis. (It is centrifugally spun outward). These two forces (exerted and centrifugal) combine into a net force vector.

As shown in FIGS. 3B.1, 3B.2 and 3B.3, the direction and magnitude of the electrical current flowing through the VC creates a magnetic field, which generates proportional force on the magnet up or down along the vertical axis (the spindle axis). This magnetic field can be used to reinforce, reduce, neutralize or reverse the effective torque the centrifugal forces impart on the hinged spindle/flutter mirror.

Additionally, in one or more of the various embodiments, the camera sensor view may be folded to save space. To enable a highly compact and robust multi-view 3D scanning system could also integrate event detectors such as single photon avalanche diodes (SPAD) or avalanche photodiode (APD) arrays into a same structure as a KLBP system Furthermore, the size and bulk of a 4×4 system (see FIG. 4.1) is substantial, i.e., it typically consists of eight separate modules and commensurately complex cabling required to power and control of twelve lasers, eight motors, and four cameras.

However, in one or more of the various embodiments, a 4×1 KLBP system (shown in FIG. 4.2) may be mounted on a printed circuit board (PCB), with four camera modules directly connected to it, e.g. via a Mobile Industry Processor Interface (MIPI) bus of each camera module sensor. The 4×4 system's eight motors would be reduced to a single spindle motor, but the actual direction diversity of the scanned laser beam pattern could double that of the prior 4×4 system, since there are now eight separate scan directions and eight (virtual) projector positions in the 4×1 KLBP system. Thus, it can illuminate and scan more complex 3D structures with minimal occlusion. Also, such a "4×1" system will be lighter, more compact, more economical to build and far easier to make robust enough to be mounted and operated at the end of a robotic arm moving at high speed, e.g., during a vehicle during assembly.

FIGS. 5A.1, 5A.2 and 5A.3 illustrate an embodiment for a KLBP system where an irregular tetrahedral (polygonal) shaped spindle mirror with unequal mirrored/reflective sides is employed to reflect a laser beam at facet mirrors within an inner cavity of a kaleidoscopic mirror (not shown). Instead of a single spindle/flutter mirror, a tetrahedral or pyramid shaped mirror may be used to deflect multiple laser beams, in multiple directions simultaneously. In the embodiment, the four sides are shown having slightly different angles at which the laser beams impinge that may vary a few degrees each. In this way, instead of each pyramid side meeting each of the 4 parallel beams, the beam incidence angles of the 4 sides of the pyramid shaped mirror might be 39, 43, 47 & 51 degrees respectively. Each angular jump of 4 degrees can make successive beams sweep at 8 degree greater or lesser inclination. The result can be a total variance of 24 degrees (total reflection angles vary from 78 degrees to 102 degrees (as shown).

FIGS. 5B.1, 5B.2, 5B.3 and 5B.4 illustrate an embodiment for a KLBP system where a tetrahedral shaped spindle mirror with fluttering mirrored/reflective sides is employed to reflect a laser beam at facet mirrors within an inner cavity of a kaleidoscopic mirror (not shown). Four pyramidal mirrored sides or "blades" are attached with hinging flexures to a common spindle axis, at slightly varying angles as described in the previous section. As the spindle speed increases, the blade angles change slightly due to centrifugal forces experienced by each of the blades. Note that this spinning set of mirrored blades would also nicely do as an air "impeller" to force some air flow around the inner cavity of the kaleidoscopic mirror to help convective cooling of hot surfaces of lasers, mounts, sensors and processors inside the system enclosures. The turbulence of the impelled airflow may even help make the mirrored blades "flutter". The angles by which they are mounted on the spindle axis may be optimized for setting a resonant "flutter" in action. In one or more embodiments, a multi blade flutter mirror mechanism in action might resemble a propellor or small fan FIGS. 5C.1 and 5C2 illustrate an embodiment of a top view of a spinning pyramid shaped spindle mirror that simultaneously reflects four laser beams at facet mirrors within an octagonal shaped kaleidoscopic mirror. The spinning pyramidal spindle mirror simultaneously scans 4 laser beam sequentially across eight facet mirrors in an octagonal configuration for a kaleidoscopic mirror. Two successive positions of the spinning spindle mirror are shown, 45 degrees apart, during the 360 rotation for a pyramidal spindle or flutter mirror. Over $\frac{1}{4}^{th}$ of the full cycle shows that all eight directions are covered by two successive strokes by four simultaneous lasers beams. Note that the four cameras ($C_1, C_2, C_3$ & $C_4$) may operate in six different stereo pair combinations, and the eight different sweep trajectories observed by any one of six such stereo pairs are less complex to associate (match or pair up) in this configuration.

Figure 6A:
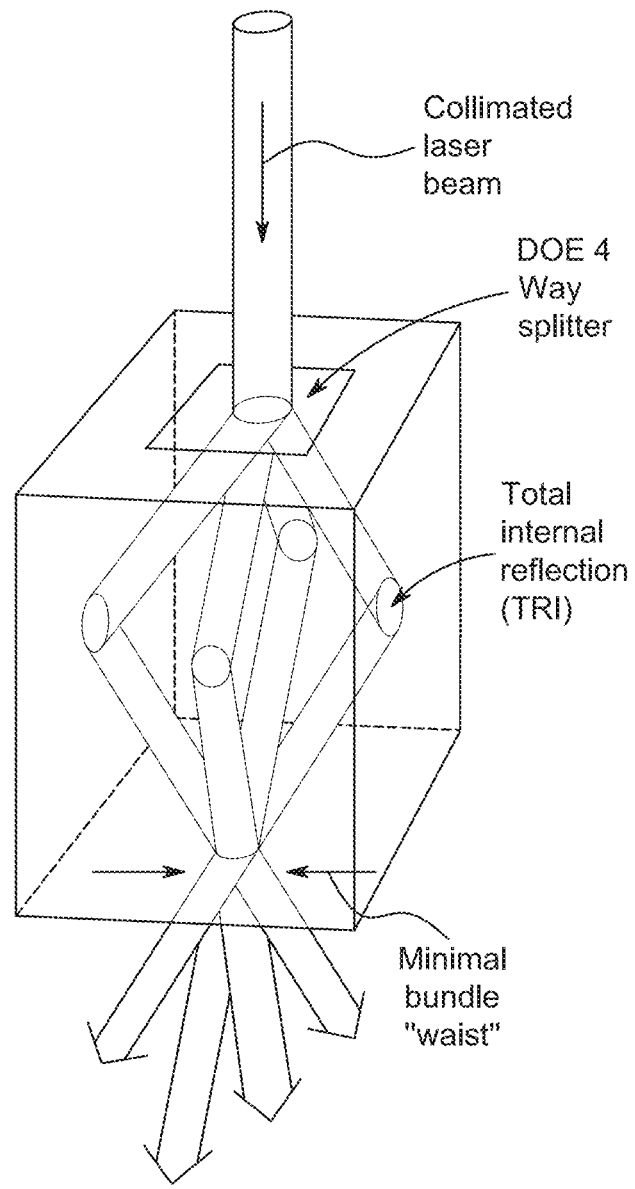
FIG. 6A shows an embodiment for having four laser beams created by a DOE and subsequently bundled as convergent laser beams.

FIG. 6A shows an embodiment for an enclosure that enables four laser beams created by a DOE side and subsequently bundled as convergent laser beams to be rebundled and exit an opposite transparent side as convergent laser beams. As shown, four beams are created by a DOE (e.g. 4 first order diffraction maxima). The 4 divergent beams are each reflected at a Total Internal Reflection angle at the sides of the enclosure and exit as convergent laser beams. In this way, a smaller spindle mirror with a single oval surface may reflect all 4 beams when it is positioned (not shown) at the minimal waist where the four beams bundle and cross over each other.

FIG. 6B.1 illustrates a plane view of an embodiment of an enclosure that employs a DOE splitter at a top surface to create two laser beams and the sides of the enclosure are arranged for total internal reflection (TIR) of the two laser beams at angles that redirect the two laser beams to travel in parallel out of a bottom surface of the enclosure.

Figure 7:
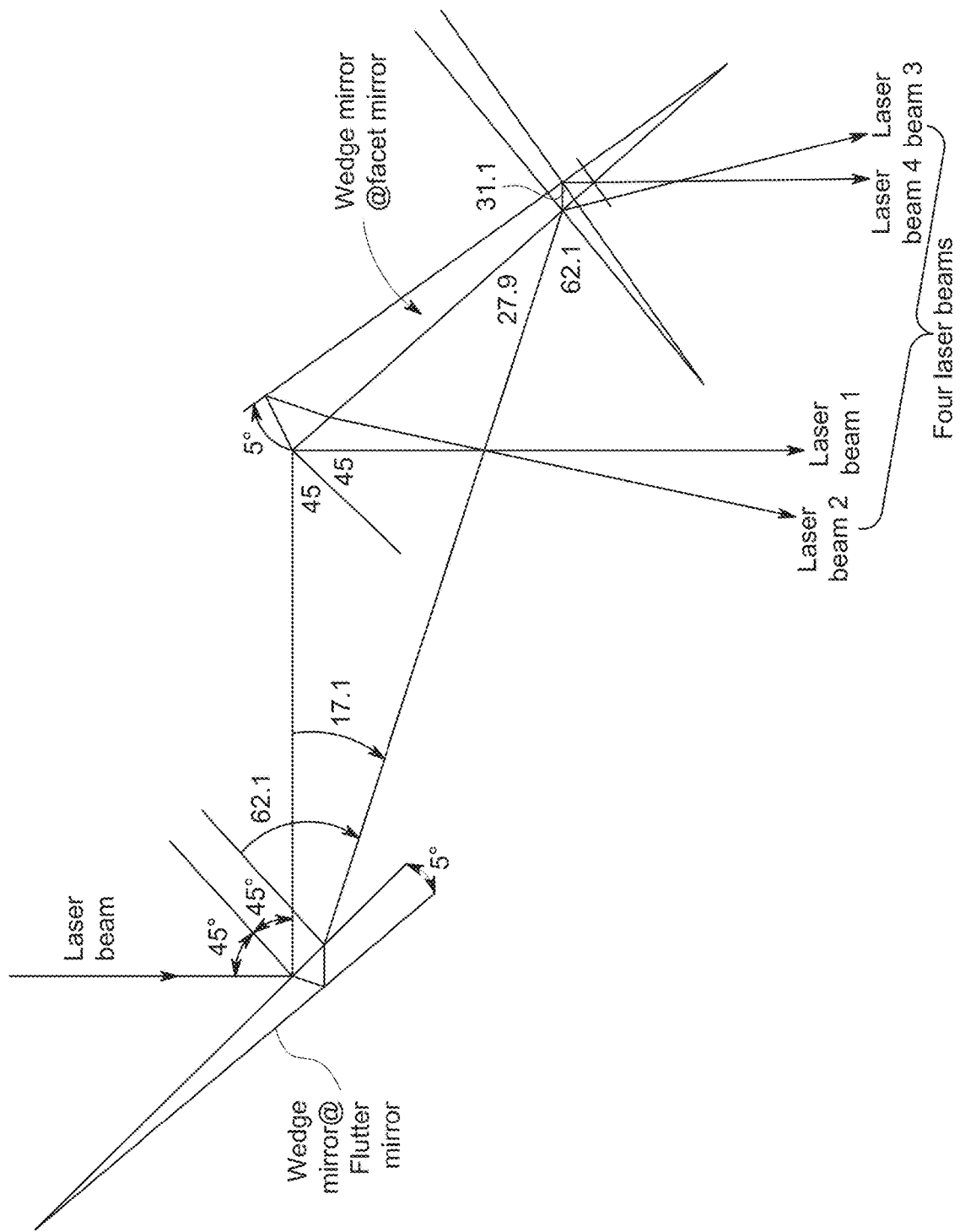
FIG. 7 shows an embodiment of a KLBP system with wedge mirrors that are included in a flutter mirror and in the mirror facets of the kaleidoscope mirror.

FIG. 6B.2 shows a perspective view of an embodiment of an enclosure that employs a DOE splitter at a top surface to create four laser beams and the sides of the enclosure are arranged for TIR of the two laser beams at angles that redirect the four laser beams to travel in parallel out of a bottom surface of the enclosure FIG. 7 shows an embodiment of a KLBP system with wedge mirrors that are included in a flutter mirror and in the mirror facets of the kaleidoscope mirror. A dual surface wedge mirror may be used to split one laser beam into two equal parts. Using wedge mirror surfaces in both the flutter mirror and each of the facet mirrors enables one laser beam to end up creating four laser beam trajectories.

Figure 8:
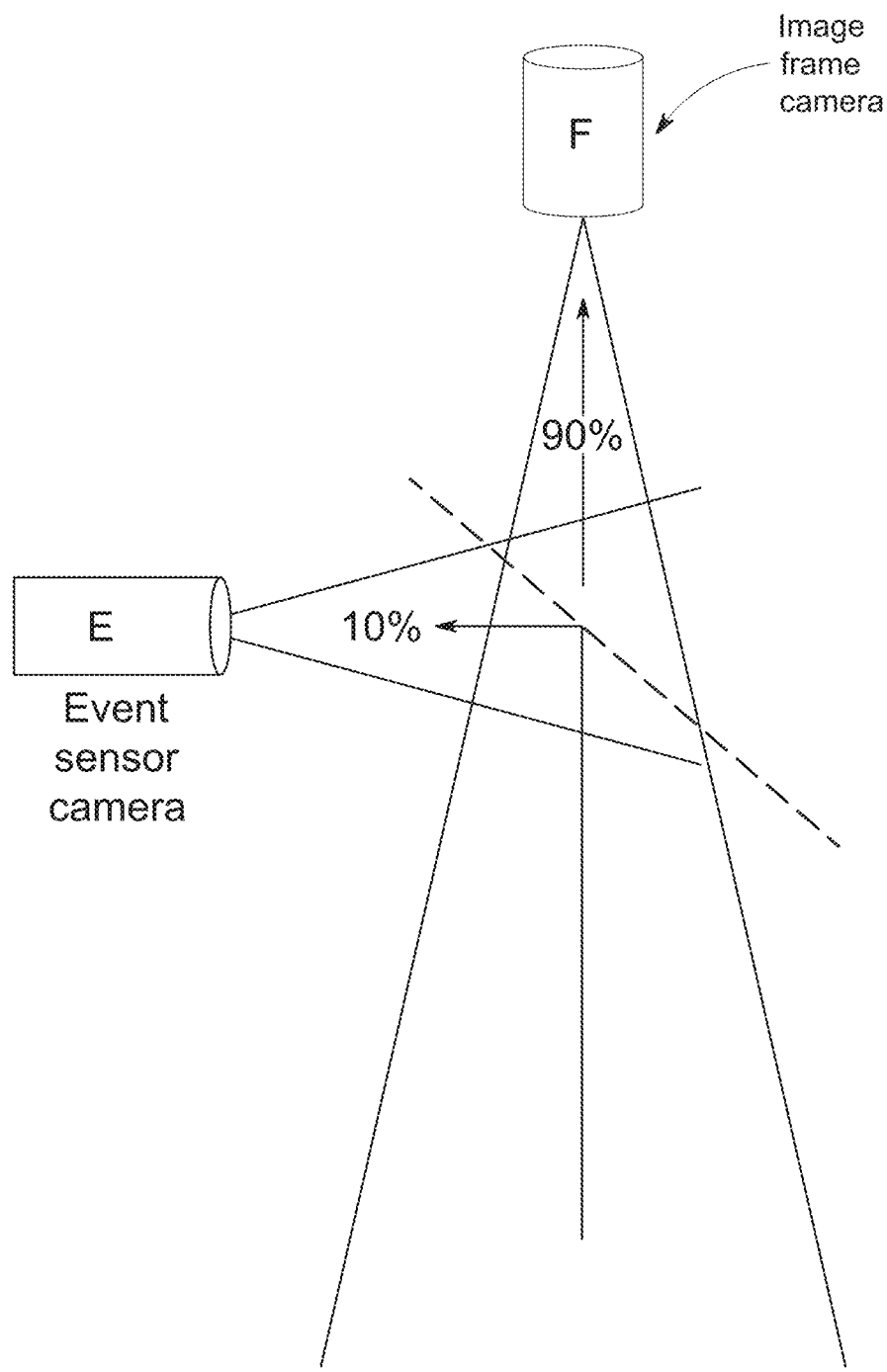
FIG. 8 illustrates an embodiment of a KLBP system where camera reflectors employ half mirrors to share reflections of surfaces between a gray scale image camera and an event sensor camera.

FIG. 8 illustrates an embodiment of a KLBP system where camera reflectors employ half mirrors to share reflections of surfaces between a gray scale image camera and an event sensor camera. The half mirrors may be used to combine different sensors and have them share the reflections of the laser beams from work surfaces from a substantially shared perspective. Depicted herein is a camera pair with one camera being an event sensor camera, the other being a regular image frame camera, such as a grey scale camera. As shown, a partially mirrored reflector apportions the majority of the light (90%) to create a high-resolution image in a grey scale image frame to be used for spatially super resolving the laser beam trajectory. The event sensor camera can be used to super resolve the same trajectory temporally.

Figure 9:
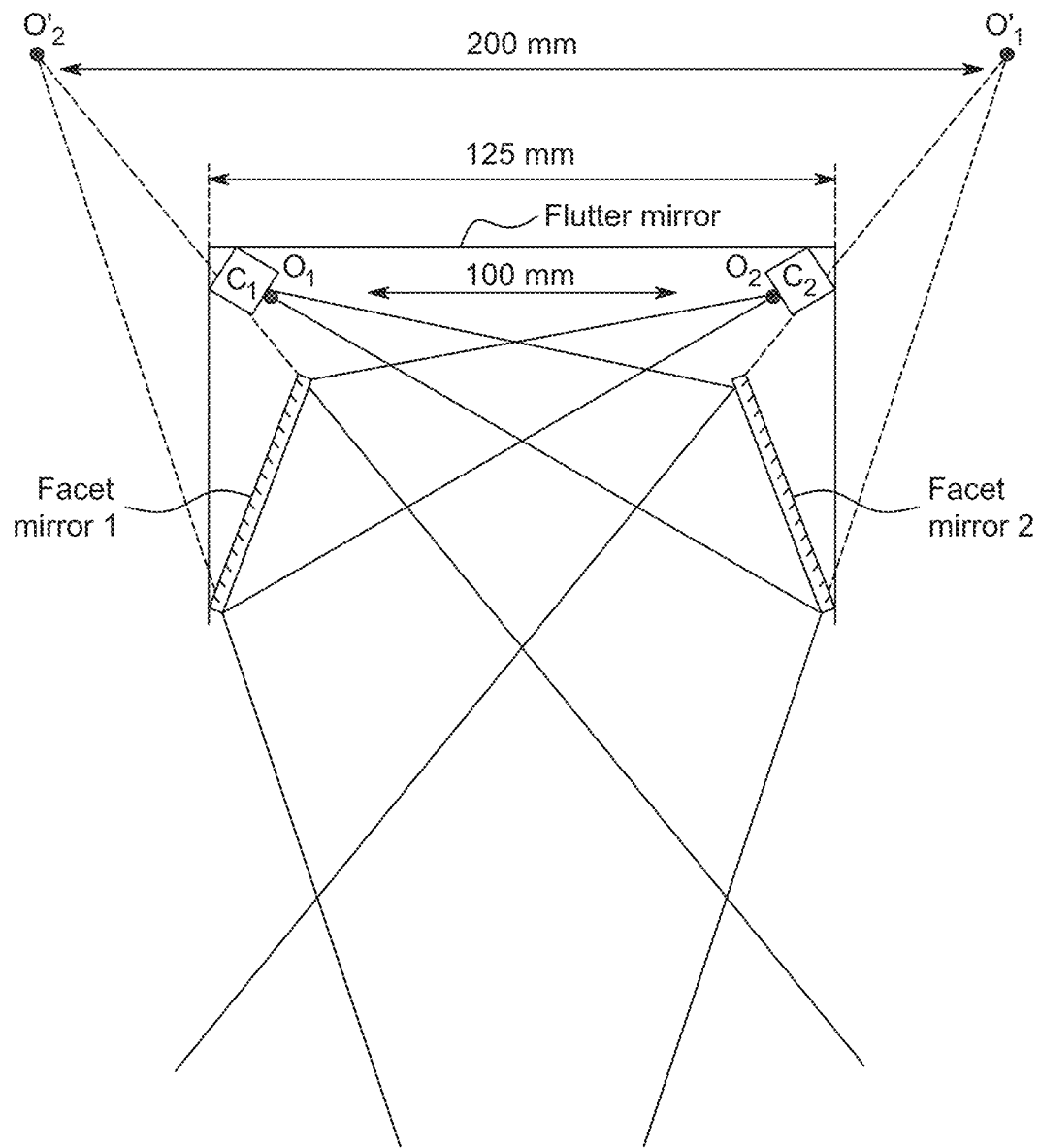
FIG. 9 shows an embodiment of a KLBP system for an "origami" ultra-compact stereoscopic scanning system.

FIG. 9 shows an embodiment of a KLBP system for an "origami" ultra-compact stereoscopic scanning system. By careful arrangement a stereo pair of cameras that have views that are "folded up and across," the system width may be reduced by almost half, while effectively maintaining the same stereo baseline and 3D resolving power. In this way, an ultra-compact 4×1 KLBP system can have enough space for a central "flutter mirror" mechanism (not depicted).

Figure 10:
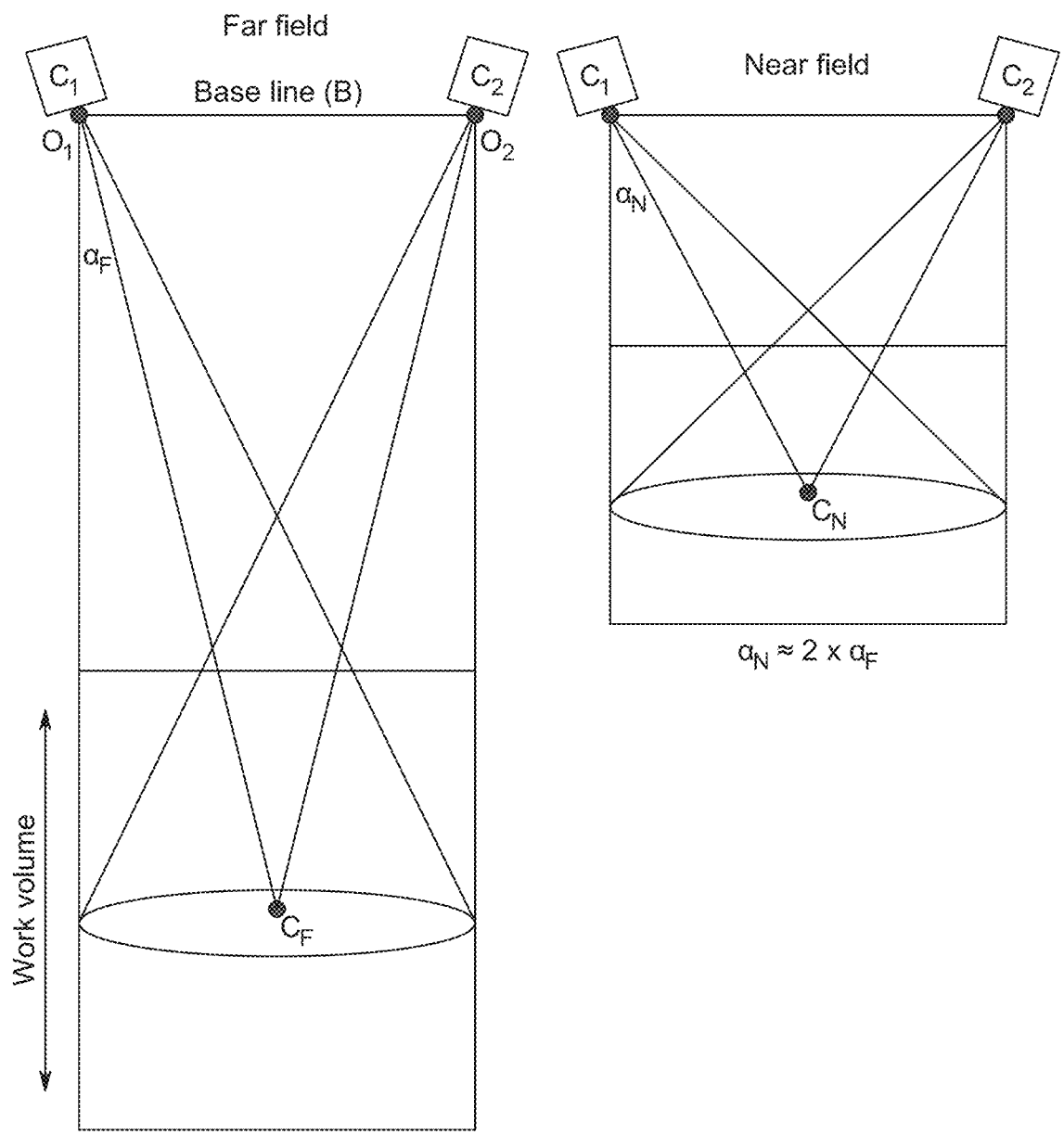
FIG. 10 illustrates an embodiment for a KLBP system with auto focus and zoom functions.

FIG. 10 illustrates an embodiment for a KLBP system with auto focus and zoom functions. For a robot manipulated moving scan head system, it can be beneficial to be able to adjust the vergence and focus of such a system "on-the-fly." This embodiment enables a zoom function of two times by adjusting a vergence of the cameras and increasing a width of view of each of the cameras as the scan head approaches the surfaces so that the same surface can be resolved at an even greater resolution. The left side the focus of the "far-field" system is at two times the baseline, and on the right side the focus of the "near-field" system is set to one times the base line so that the 3D range resolution may be greater. The intrinsic and extrinsic parameters of this system can be dynamically adjusted and (optionally) stored in look up tables after the initial calibration.

Figure 11:
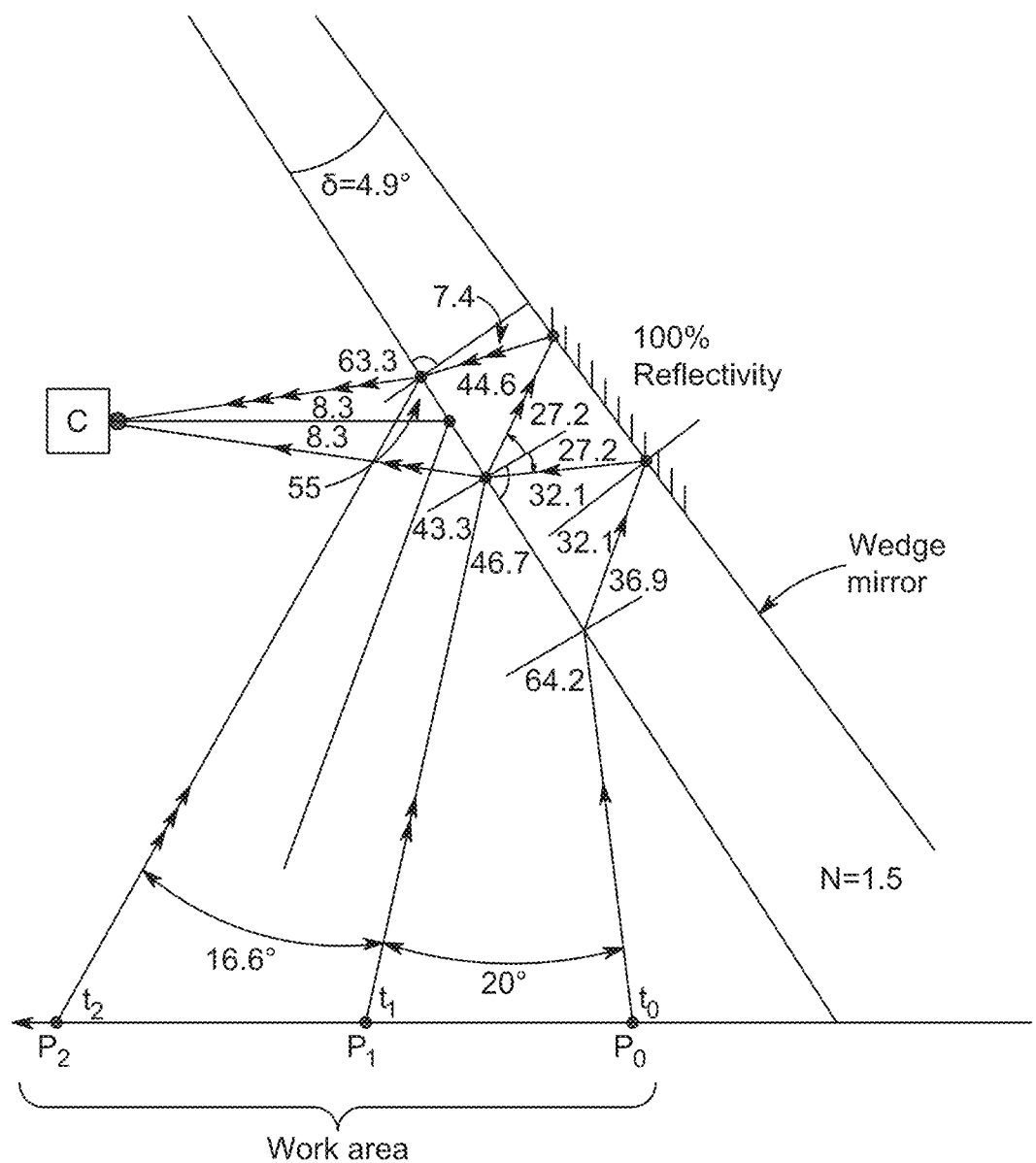
FIG. 11 shows an embodiment of the KLBP system where a wedge mirror is employed to double the field of view of a camera.

FIG. 11 shows an embodiment of the KLBP system where a wedge mirror is employed to double (fold) the field of view of a camera. The field of view of camera (C), may be more than doubled in one dimension, without loss of resolution (pixels/degree), by having it image the work area (WA) through a dual surface wedge mirror (WM), where a projected laser spot will be projected to traverse the sensor in the camera twice as the spot traverses WA.

Further, the wedge mirror may have a front surface that is only partially reflective. A fraction of the light impinging on its surface can be reflected in a specular way; the remaining portion (1−f) may be refracted towards the interior, through the transparent medium of the wedge mirror, and can be reflected by the back mirror surface (the back surface interior reflectivity typically will be 100%). The wedge mirror has two surfaces: its partially reflective front planar surface, and its fully reflective back planar interior surface that are diverging at a wedge angle δ which is typically smaller than 10 degrees.

At to, a fraction (1−f) of light from the spot at $P_0$ can by refraction enter the wedge mirror's interior, at a slightly lesser angle from the normal, following Snell's law of refraction, then go on to reflect on the back surface of the mirror and a fraction (1−f) of this light may then refract back out of the wedge mirror towards the camera C's lower edge of its field of view. The three consecutive paths of the chief light rays are denoted by ">". The relative intensity of the light that follow this interior path is: $(1-f)^2$. Also, at $t_1$, the laser spot's trajectory has reached point $P_1$, and its light following the path denoted by ">>" should have reached the opposite end of the camera's field of view, and the spot's image has fully traversed the width of the sensor. Note that a second portion f of the light from spot $P_1$ can directly reflect and reach the opposite end of the sensor at this point, as denoted by ">>" also. Thus, the spot as projected on the camera sensor at $t_1$ may appear to "jump back" to the same position where it began traversing the sensor at to.

Additionally, at $t_2$ the scanning laser spot has reached $P_2$ where its observed trajectory across WA ends, and it has arrived at the other end of the sensor for the second time. Thus, by this method of "folding" the view of the camera, the sensor is traversed twice, utilizing the inherently limited pixelation of the sensor more effectively. In it is noteworthy in this example that event sensors are available with 720 columns of each 1280 pixels with a pixel pitch of 4.86 micron, when using a lens with focal length of 12 mm, which yields a maximum angular field of view across 720 columns of only 16.6 degrees. With the wedge mirror, with a wedge divergence angle (δ) of approx. 4.9 degrees, and a transparent mirror interior medium with an index of refraction of 1.5, the spot can be tracked across a wider angle of 36.6 degrees (16.6 directedly via the front surface mirror and approx. 20 degrees via the second back mirror, and two refractive redirections). Thus, the wedge mirror may double the resolution of an event sensor and is an economical way to widen the field of view, without loss of resolution, or conversely to double the resolution without a loss of field of view.

Furthermore, by choosing "f" the mirror fraction of the front surface carefully the brightness of the two trajectories can be made approx. equal. (solving $f=(1-f)^2$, we get f≈38.2%). It is noteworthy that this method may "waste" about 24% of the light, however it can enable the use of a longer focal length lens, which allows for the use of a greater aperture, a better lens quality and possibly a more compact design. By varying the wedge angle and/or the refraction index of the mirror's interior transparent medium, the two traversals of the event sensor can partially overlap in time, if so desired. A higher refraction index material can result in a greater expansion of the field of view of the system. Thus, this method of expanding the field of view of a system is particularly appropriate for a laser scanning or metrology system, to maximize the resolution of a camera system. This method may be applied to regular frame cameras, time of flight (ToF) cameras, or event sensor cameras, and in any system where having a greater angular resolution to track a spot is useful.

Figure 12:
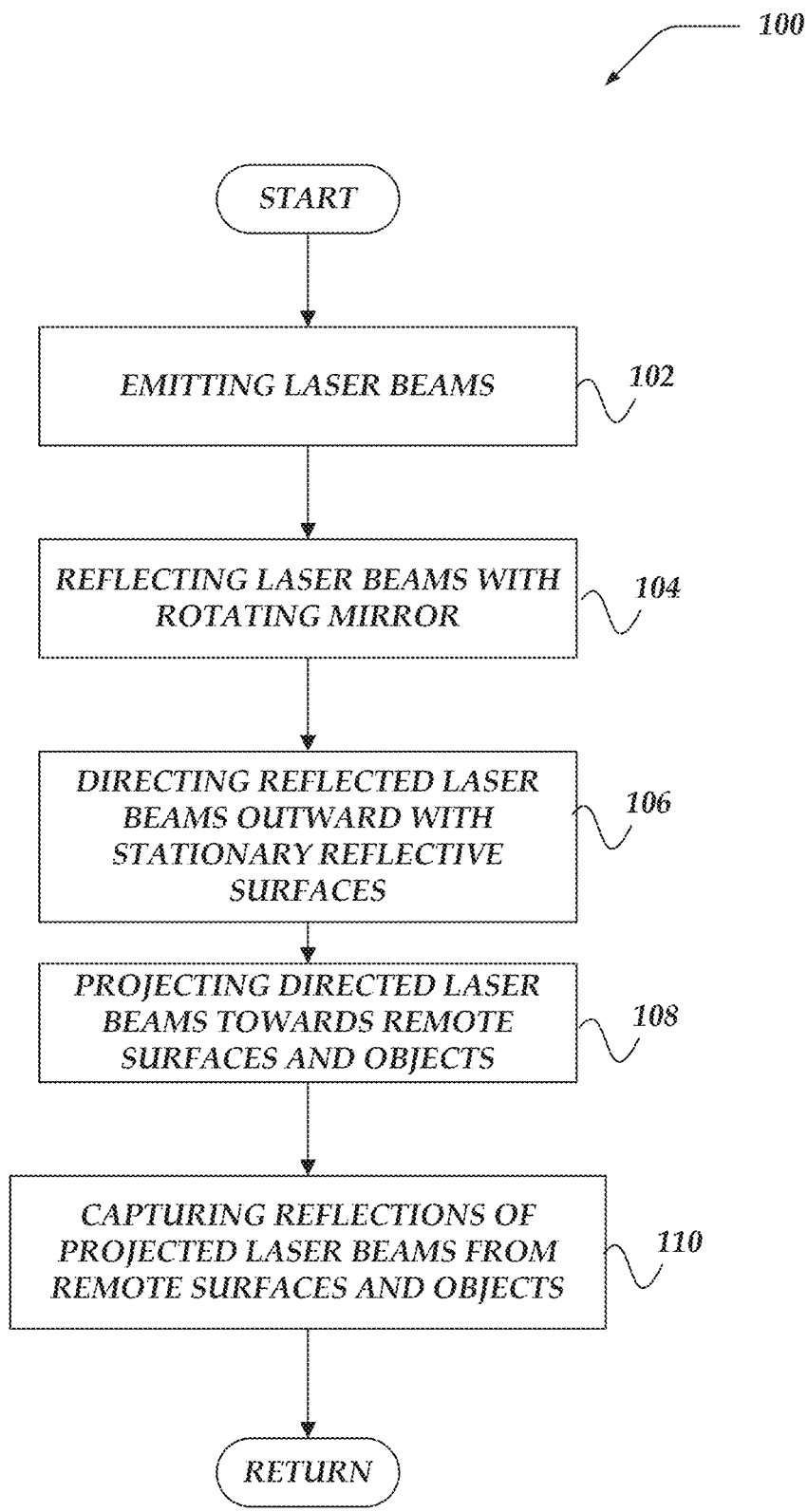
FIG. 12 shows a flow chart for an embodiment of a process for performing the actions of the KLBP system in accordance with the various embodiments.

FIG. 12 shows a flow chart for overview 100 of a process for performing the actions of the KLBP system. Moving from a start block, the process flows to block 102 and one or more laser beams are generated and emitted by a light source. At block 104, the emitted laser beams are reflected by a rotating mirror deflector in a radially whirling movement while it spins around an axis.

Stepping to block 106, a plurality of stationary reflective facet mirrors are positioned within a hollow polygonal shaped structure in a concave arrangement around the rotating mirror deflector. Each facet mirror reflects a portion of the radially whirling movement of the one or more laser beams and directs the reflected portion outward from the concave arrangement in one or more different sweep directions.

At block 108, the directed laser beams are projected to create sweeping patterns on remote surfaces and/or objects. The sweeping patterns include a diversity of different sweep directions for a diversity of laser beam emission apertures.

Flowing to block 110, reflections of the projected laser beams are captured by two or more cameras positioned to provide stereoscopic imaging of the remote surface and/or the object.

Next the process moves to the return block and performs other actions.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

The foregoing examples and descriptions should not be construed as limiting or exhaustive, but rather, an illustrative use case to show an implementation of at least one of the various embodiments.

What is claimed as new and desired to be protected by Letters Patent of the United States is:

1. A method for projecting one or more laser beams in one or more sweeping patterns, comprising:
   generating one or more laser beams from a light source;
   emitting the one or more laser beams onto a rotating mirror deflector that includes one or more reflective surfaces, wherein the rotating mirror deflector is configured to rotate the one or more reflective surfaces around a spindle axis;
   reflecting the one or more laser beams from the rotating mirror deflector in a radially whirling movement;
   directing the one or more reflected laser beams using a plurality of facet mirrors in a concave arrangement that are positioned around the rotating mirror deflector, wherein each facet mirror reflects a portion of the radially whirling movement of the one or more laser beams and directs the reflected portion outward from the concave arrangement in one or more different sweep directions; and
   projecting the one or more directed laser beams to create the one or more sweeping patterns on one or more of a remote surface or an object, wherein the one or more sweeping patterns include a diversity of different sweep directions for one or more laser beam emission apertures.

2. The method of claim 1, wherein the one or more reflective surfaces of the rotating mirror deflector further comprise:
   a flutter mirror configured to change its inclination angle during rotation.

3. The method of claim 2, wherein the inclination angle of the flutter mirror is dynamically changed by centrifugal forces acting on an eccentric mass of the flutter mirror during rotation.

4. The method of claim 2, wherein the inclination angle of the flutter mirror is dynamically controlled by a magnetic field generated by a voice coil positioned adjacent to the flutter mirror.

5. The method of claim 1, further comprising:
   splitting the one or more emitted laser beams into a plurality of laser beams using a diffractive optical element.

6. The method of claim 5, wherein the diffractive optical element is embedded in one of:
   the one or more reflective surfaces of the rotating mirror deflector;
   the plurality of facet mirrors; or
   a cylindrically shaped structure positioned around the rotating mirror deflector.

7. The method of claim 1, wherein the concave arrangement of the plurality of facet mirrors, further comprises:
   positioning each of the facet mirrors on an interior surface within an inner cavity of a stationary kaleidoscopic mirror having a hollow polygonal "cup" shape, wherein the rotating mirror deflector spins around a spindle axis located within the hollow kaleidoscopic mirror's inner cavity.

8. The method of claim 1, wherein the one or more reflective surfaces of the rotating mirror deflector further comprises a polygonal shaped spindle mirror having a plurality of reflective sides.

9. The method of claim 1, further comprising:
capturing reflections of the one or more projected laser beams using two or more cameras positioned to provide stereoscopic imaging of the one or more remote surface or the object.

10. The method of claim 1, further comprising:
capturing reflections of the one or more projected laser beams using one or more of an image frame camera or an event sensor camera.

11. A laser beam projection system comprising:
one or more light sources configured to emit one or more laser beams;
a rotating mirror deflector that includes one or more reflective surfaces positioned to reflect the one or more emitted laser beams, wherein the rotating mirror deflector is attached to a spindle driven by a motor;
a hollow polygonal "cup" shaped structure having an inner cavity with a plurality of facet mirrors arranged in a concave arrangement and positioned around the rotating mirror deflector, wherein each facet mirror reflects a portion of the radially whirling movement of the one or more laser beams and directs the reflected portion outward from the concave arrangement in one or more different sweep directions; and
wherein the system is arranged to project the one or more directed laser beams to create a pattern on one or more of a remote surface or an object, and wherein the pattern is arranged to provide a diversity of different sweep directions for one or more laser beam emission apertures.

12. The system of claim 11, wherein the one or more reflective surfaces of the rotating mirror deflector further comprise:
a flutter mirror configured to change its inclination angle during rotation.

13. The system of claim 12, wherein the inclination angle of the flutter mirror is dynamically changed by centrifugal forces acting on an eccentric mass of the flutter mirror during rotation.

14. The system of claim 12, further comprising:
a voice coil positioned adjacent to the flutter mirror, wherein the inclination angle of the flutter mirror is dynamically controlled by a magnetic field generated by the voice coil.

15. The system of claim 12, further comprising:
a diffractive optical element that is employed to split the one or more emitted laser beams into a plurality of laser beams.

16. The system of claim 15, wherein the diffractive optical element is embedded in one of:
the one or more reflective surfaces of the rotating mirror deflector;
the plurality of facet mirrors; or
a cylindrically shaped structure positioned around the rotating mirror deflector.

17. The system of claim 11, wherein the concave arrangement of the plurality of facet mirrors, further comprises:
a motor that spins the rotating mirror deflector around a spindle axis located within the inner cavity.

18. The system of claim 11, wherein the one or more reflective surfaces of the rotating mirror deflector further comprises:
a polygonal shaped spindle mirror having a plurality of reflective sides.

19. The system of claim 11, further comprising:
two or more cameras that are positioned to capture stereoscopic images of captured reflections of the one or more projected laser beams from the one or more of the remote surface or the object.

20. The system of claim 11, further comprising:
one or more of an image frame camera or an event sensor camera that are employed to capture reflections of the one or more projected laser beams from the one or more of the remote surface or the object.

* * * * *